(12) United States Patent
Thorsen

(10) Patent No.: US 8,694,763 B2
(45) Date of Patent: Apr. 8, 2014

(54) METHOD AND SYSTEM FOR SECURE SOFTWARE PROVISIONING

(75) Inventor: Hans Thorsen, Lidingö (SE)

(73) Assignee: Oniteo AB, Kista (SE)

( * ) Notice: Subject to any disclaimer, the term of this patent is extended or adjusted under 35 U.S.C. 154(b) by 768 days.

(21) Appl. No.: 12/279,771

(22) PCT Filed: Feb. 23, 2007

(86) PCT No.: PCT/SE2007/000169
§ 371 (c)(1),
(2), (4) Date: Jul. 26, 2010

(87) PCT Pub. No.: WO2007/097700
PCT Pub. Date: Aug. 30, 2007

(65) Prior Publication Data
US 2010/0287363 A1    Nov. 11, 2010

(30) Foreign Application Priority Data
Feb. 24, 2006 (SE) ........................................ 0600416

(51) Int. Cl.
*G06F 9/00* (2006.01)
*G06F 9/44* (2006.01)
*G06F 21/57* (2013.01)

(52) U.S. Cl.
CPC .............. *G06F 9/4406* (2013.01); *G06F 9/441* (2013.01); *G06F 21/575* (2013.01)
USPC .................................................. 713/2; 713/1

(58) Field of Classification Search
CPC ..... G06F 9/4406; G06F 9/4408; G06F 9/441; G06F 21/575
USPC ......................................................... 713/2, 1
See application file for complete search history.

(56) References Cited

U.S. PATENT DOCUMENTS

| 4,975,950 | A | * | 12/1990 | Lentz | ............................... 726/24 |
| 5,121,345 | A | * | 6/1992 | Lentz | ............................ 713/188 |
| 5,421,006 | A | | 5/1995 | Jablon et al. | |
| 5,742,758 | A | * | 4/1998 | Dunham et al. | ................ 726/18 |
| 6,185,678 | B1 | | 2/2001 | Arbaugh et al. | |

(Continued)

FOREIGN PATENT DOCUMENTS

| EP | 0 606 771 | 7/1994 |
| WO | WO 01/27770 | 4/2001 |

*Primary Examiner* — Chun Cao
(74) *Attorney, Agent, or Firm* — Drinker Biddle & Reath LLP

(57) ABSTRACT

A method and system for the provisioning of software that enable large scale installation and management of software in computer units in a highly secure manner. The BIOS of the target computer unit is adapted such that upon power up the system attempts to boot from an external media. The BIOS features functions within the code for the implementing a system watchdog for assuring the system remains in a known state, a function for digital signature verification, and loads drivers for a file system. The external media includes the operating system (OS) image and other bootstrap files, each having been digitally signed with an asymmetric private key that corresponds to the public key. A programmable read-only parameter memory on the motherboard is configured to store the public keys and the (failure) state of the system independently of the primary and secondary media enabling reboot from an alternative boot path.

17 Claims, 18 Drawing Sheets

(56) References Cited

U.S. PATENT DOCUMENTS

| | | |
|---|---|---|
| 6,263,431 B1 | 7/2001 | Lovelace et al. |
| 6,546,547 B1 * | 4/2003 | Runyan et al. ................. 717/124 |
| 6,711,675 B1 | 3/2004 | Spiegel et al. |
| 6,754,818 B1 * | 6/2004 | Lee et al. ........................... 713/2 |
| 7,340,638 B2 * | 3/2008 | Nicholson et al. ........... 714/6.11 |
| 8,095,783 B2 * | 1/2012 | Chong et al. ..................... 713/2 |
| 8,291,226 B2 * | 10/2012 | Chun et al. ..................... 713/176 |
| 2003/0005278 A1 * | 1/2003 | Deng et al. ........................ 713/2 |
| 2003/0196085 A1 | 10/2003 | Lampson et al. |
| 2004/0153724 A1 | 8/2004 | Nicholson et al. |
| 2004/0236997 A1 * | 11/2004 | Poo .................................. 714/36 |
| 2005/0005197 A1 | 1/2005 | Chong et al. |
| 2005/0055566 A1 | 3/2005 | Huang et al. |
| 2005/0138414 A1 | 6/2005 | Zimmer et al. |

\* cited by examiner

METHOD AND SYSTEM FOR SECURE SOFTWARE PROVISIONING

RELATED APPLICATION DATA

This application is a §371 National Stage Application of PCT International Application No. PCT/SE2007/000169 filed Feb. 23, 2007, the entire contents of which are incorporated herein by reference. This application also claims priority under 35 U.S.C. §119 and/or §365 to Swedish Application No. 0600416-2, filed Feb. 24, 2006, the entire contents of which are incorporated herein by reference

FIELD OF THE INVENTION

The present invention relates generally to the provisioning of software to computer systems. More particularly, the invention relates to a method and system for provisioning the installation and management of software in computers in a highly secure manner on a large scale basis and provides high resilience against software failures.

BACKGROUND OF THE INVENTION

Much attention has been given to the issue of computer security in recent years. Many efforts for improving computer security have been direct toward software protection and combating software threats such as viruses, "Trojan horse" attacks and other malicious software attacks. Several solutions have been put forth to deal with software protection such as the concept of "trusted software" and to obtain "software integrity" to ensure reliable systems that operate under an established security policy for the system. "Trusted software" relates to the idea of ensuring that the installed software can be trusted by the customer and was free from tampering by unauthorized persons. Major efforts have been directed into developing software security products designed to deal with viruses and malicious software that can infect computer systems.

Although many software security products do effectively detect, prevent, and remove viruses, they do so while running on top of the operating system (OS) and confidence that the security is maintained depends on whether it can be reasonably established that the OS has not been compromised during the bootstrap phase. Patents such as U.S. Pat. No. 6,185,678 describe methods to provide a secure bootstrap process where the integrity of the bootstrap process is ensured by the architecture that initializes a computer system using public key cryptography. However, the emphasis on the software security at this level occurs after the device has been constructed and presupposes that it was delivered to the customer with trusted software and that security has was not breached at any time during the production process. This means that during the manufacturing stage the integrity of the production and distribution supply chain is vitally important, especially when there may be several independent entities involved in the production chain.

Computer systems and many consumer electronics products are typically delivered with preinstalled operating software on the system making them operable right out-of-the-box. However, it is sometimes the case that software revisions and upgrades are developed during the production process by a separate design team located in another country that has a contractual outsourcing relationship with the manufacturer. These outsourcing relationships are often established for cost reasons where manufacturing occurs in lower cost labor markets. The issue of security and software integrity becomes an important issue to the manufacturer when there are several players in the supply chain. An example is where a first company having a software-based application that provides functionality to common computer hardware as its chief product such as a video gaming console or PBX product running on a standard PC-platform. The software may be developed by the developer in a first country and then sent to second company in a second country for manufacturing and assembly. In such an arrangement, it becomes vitally important to the software developer that firstly; they can guarantee that the integrity of the software i.e. no malicious code was injected during the manufacturing process, and secondly the software, which is their high valued-added component, is not being illegally copied or pirated at the lower end of the supply chain. Without a way of protecting the software the manufacturer would be free to clone and install the product on additional hardware platforms "on the side" since the commoditized hardware is generally the lower cost (value) item making up the product.

One way of mitigating some of the above problems is to use Public key cryptography (e.g. Asymmetric Key Cryptography) that enables one to verify that a software file image, such as an operating system (OS) image, is authorized to be downloaded into a hardware device. Public key digital signature algorithms can be used for sender authentication in that digital signatures can be used to authenticate the originator of the software image. Creating a digital signature for a software image typically involves computing a modification detection code for the software image. A further computation using a mathematical algorithm is used to "sign" the code with a private-key known only to the originator of the software image. The public key that corresponds to the originator's private key is made widely available to authenticate the sender. Asymmetric Key Cryptography allows the original software developer to encrypt a software image with his own private key and send it to another user who can decrypt it using the corresponding public key resulting in a highly secure transaction. Furthermore, it provides assurance that the originator (and no other) had sent the image without the originator having to reveal his private key.

In addition to security, other issues that are important to the software developer involve the concepts of availability, safety or resilience to failure. The term "availability" is used herein to refer to the ability to distribute software or software upgrades to a large number of units in an efficient and cost effective manner. For example, there is a need for the company doing the primary assembly work on the computer hardware to install or upgrade software on perhaps tens of thousands (or more) production units without requiring support personnel to attend to the units individually. The cost of the labor required for individual attention in this case would be prohibitive, not to mention experiencing a high recurring cost each time an upgrade is required or when there is a software or hardware malfunction. Moreover, if the product is deployed in the field in a remote location the cost of sending support staff to service it would be very high. Thus, there is a need for making the software installations or upgrades "available" in a secure manner to multitudes of units without requiring significant amounts of labor.

The concept of "resilience to failure" is used herein to refer to the ability of the units to recover from a catastrophic software failure. For example, there is a need for the ability to cope with a situation where software hangs from e.g. code bugs or corrupt data. A suitable mechanism is required that would enable the unit to recover and begin operating again while the unit is operating in the field, preferably without the need of significant labor by service personnel.

U.S. Patent Pub. No. 2005/0138414 to Zimmer et al. presents a method for storing boot options and integrity information on a portable token for use in a pre-operating system (pre-boot) environment. Upon booting the computer system validates an OS image using a token prior to it being loaded for execution. [IS THIS CORRECT?] The token is intended to be a tamper-proof media such as a smartcard or read-only CD which is provided to an authorized person to insert into the computer to validate the OS image. The token, inserted during the pre-boot phase, contains a binary object containing a public-key for corroborating the integrity of an OS image that is loaded from a local mass storage disk or loaded from the network. In addition, a personal identification number (PIN) and/or a biometric sensor may be employed along with the token for enhanced security.

Although the procedure described in Zimmer was developed to provide a high security mechanism for validating OS images by way of a portable personal token, it does not address the issue "availability" in the sense that validations on computer systems en masse are not suitable when using personalized tokens. This is especially true if additional security measures such as PIN codes or biometrics are required to be input by the token holder. The method inherently elicits a tradeoff between high security and high availability since it requires the presence of the token holder for the boot phase for software installations and upgrades. Furthermore, there is no verification on the token itself to verify that it is secure at the time of insertion. This leaves open the possibility that the token itself could be tampered with and rendered ineffective. The method is confined to the pre-boot environment which means that the BIOS, residing in read-only memory is the first program to run upon initialization, typically performs some relatively simple initial system checks. The BIOS contains only a few kilobytes of code and thus is not able to execute the more complex types of security policies that can be run in the post-boot environment.

The BIOS performs some initial system checks on the system and contains only a few kilobytes of code thus it has relatively limited capabilities for enabling more complex types of security policies.

In view of the foregoing, it is desirable to provide a method and system that provides control throughout the production chain that in a way that provides security of software with high availability and resilience to failure in an efficient and cost effective manner.

SUMMARY OF THE INVENTION

Briefly described and in accordance with embodiments and related features of the invention, there is provided a method and system suitable for provisioning, on a large scale, the installation and management of software in computer units that is highly secure and resilient against software failures. The invention can be adapted for use in online, offline, and stand alone situations. In an embodiment of the invention, the BIOS of the target computer unit is adapted such that, upon power up, it directs the system to initially boot from a secondary media on the USB port i.e. from an inserted USB memory stick. The BIOS features functions within the code for the implementing a system watchdog for assuring that the system is in a known state, a function for digital signature verification, and loads drivers for file system access capabilities for accessing on a file basis rather than the typical master boot record accessing on a boot and sector basis. The USB-stick, which can be any portable USB compatible storage device capable of storing files such as USB flash drives or MP3 players, includes an operating system (OS) image and related bootstrap files, each having been digitally signed using an asymmetric cryptographic key system by the image originator with his private key. The corresponding public key is stored on a non-volatile parameter memory e.g. on the motherboard of the unit at the time of manufacture and can be replace by various actor entities throughout the production process or at the customer level.

The OS image is loaded into the system from the USB-stick only upon successful verification of the digital signatures. If the verification fails the "dirty_USB" counter is incremented the system attempts a number of reboots up to a maximum number of predetermined attempts "USB_max", after which it attempts to boot from the internal primary media e.g. Compact Flash on the motherboard. If the OS image on the USB-stick is verified it is loaded into the system and a code jump is executed from the USB OS image (if the primary OS image is valid and the "ATB" flag is set to one) to an appropriate kernel of the primary operating system. The jump is transparent and the operating system continues to run as if it has been running from the primary memory.

The system is resilient in the face of power failure during software upgrades of the secondary USB media where the state is stored in the programmable read-only parameter memory and the where the watchdog assures state of the system is known otherwise it is rebooted to a known initial state. The system reboots a limited number of times until the maximum number "USB_max" is reached, at which point it attempts to boot from the primary memory. If both primary and secondary media are corrupt the reboot cycle is continued until a valid OS image is found e.g. by inserting a new USB-stick into the unit. With the USB-stick pre-inserted the method enables software upgrades to occur virtually unattended since it does not require significant intervention by support personnel. Security and trust is maintained throughout the production chain via the use of digital signatures on the image files regardless of the media carrier and who handles it.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

Figure 1:
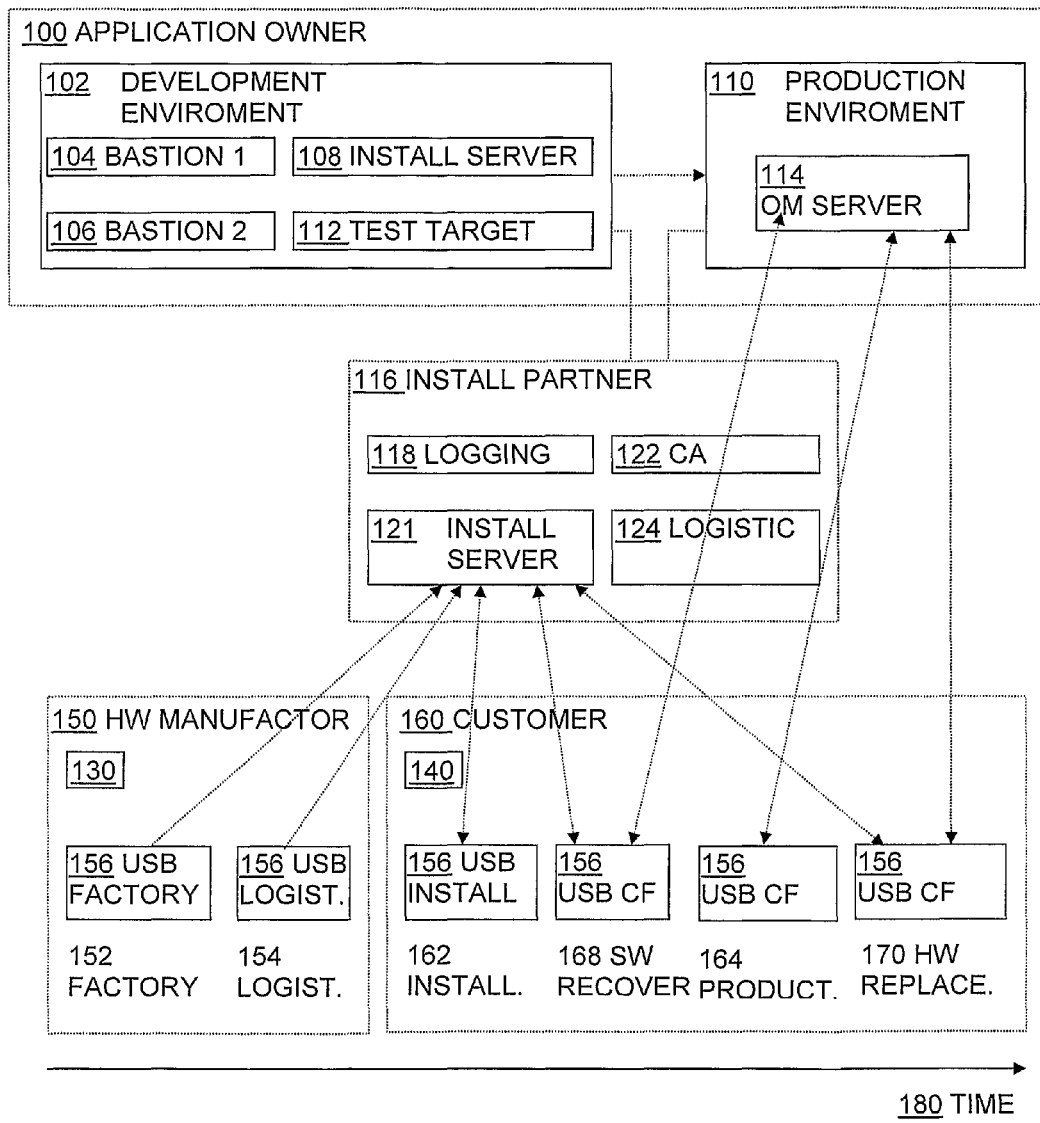
FIGS. 1 and 1A-1G is an overview of the system architecture operating in accordance with an embodiment of the invention.

The present invention describes various embodiments that highlight various aspects of the invention relating to security provisioning and availability, the concepts of which are integrated into the overall system architecture and throughout the entire production cycle of the product. The provisioning system enables remote software installation and upgrades for platforms attached to several classes of applications that relate to online use case, wired, wireless, and offline system use cases. The most detailed embodiments here are for the IBM-compatible PC system, running a kernel based operating system such as Linux or Windows™ although the invention can be modified for use in other computer architectures and operating systems.

In accordance with the invention, the architecture is implemented at several system levels including in hardware and software components, requirements, and administrative routines. The components include a Target, Bastion Server, Server, and External boot media. The Target is defined as the system unit that hosts the secure managed platform as described in this discussion. The Bastion Server is defined as an offline server that hosts encryption keys in a highly secure environment. The Server is defined as a server that is used to host a function needed in the support infrastructure. The secondary boot media is usually a portable storage media such as a USB flash memory stick/drive or a USB mini-disk drive, the use of which is to provide an inexpensive medium for alternative booting procedures that are important for making computers highly available. The USB-stick is also used to exchange data with Bastions-servers since the bastion signs the image and the network has relatively high latency. Other types of USB-sticks used in this document are Transfer sticks, Installer sticks, Reset sticks, and Factory configured sticks.

For large-scale production environments the different tasks in the provisioning chain are delegated to various different actors. In the early development phase the same actor executes all tasks. The same technology is used independently of the scale of the project where the difference lies in the distribution of the functionality among hardware and the administrative routines.

We now introduce an extension to the concept of actors involved the implementation and are defined as follows. It should be noted that not all actors are necessary for implementing the invention whereby the inclusion of any individual actor may depend on the specific application.

Base Software Developer

This actor is responsible for tailoring the operating system and bundling utilities such as mail servers, relational database etc. into a software package. The base software is typically handled by a monolithic image since there may be many dependencies between hardware and the different software modules included in the package.

An example is the MMX-graphics engine included in some processors. This can be used for echo cancellation in e.g. a telephony application, however, the kernel must be tailored and the PBX-application running on top of the kernel must be aware of this. On the other hand, graphics should be removed to reduce latencies to avoid interrupting the voice signal. The example illustrates the dependencies inside the base software and the need for handling the base as a monolith.

Service Software Developer

An alternative to having all software functions in a monolithic base software image is having the functions handled individually as services. The service is integrated into the provisioning system in all aspects of the process. The provisioning system includes a development environment with support for many platforms and a build system that creates signed and encrypted images for mass deployment.

The software developer is responsible for the developing the application and using the building environment to create images for the Target units. The building environment is based on a tradition system with additions for provisioning.

Release Officer

Although a newly developed software image may have passed the various validity tests, there is a need for an independent actor, the Release Officer, to approve the release the image into the production system. The Release Officer is responsible for all operations relating to the Bastion CA-server that hosts the sensitive cryptographic keys. For example, since development and production are different in most aspects the base software and service images tested are passed to the Release Officer that uses his Release officer Key (ROK) to create a signed request against a highly secure Offline CA, who applies the Boot production Key (BPK) for the base images and the Service KEY (SK) for services.

Manufacturer

The manufacturer is responsible for the overseeing the requirements of the provisioning systems towards the hardware vendor are manifested in the test and configuration server located in the end of the assembly line. For each production batch there is a manifest that controls all tests and configurations. Security is also integrated in this procedure. If the target contains a RSA-chip (such as an Atmel AT97SC3202 chip) it will be initialized and the public part of the key will be extracted from the chip, otherwise the serial number will be written to a non-volatile memory that is typically part of the motherboard.

Logistics Partner

Since lead-time of hardware production is often more than 10 weeks and may not match the market requirements, thus the production must be made in a large batch process and sent to Logistics Partner. Expensive standard components such as computer memories can be purchased on the basis of confirmed orders. The Logistics Partner and manufacturer can be one and the same actor depending of the level of trust.

Provisioning Partner

Provisioning Partner provides the development system such as the software for the backend servers needed for the provisioning and provides the hardware requirements for the target.

Install Partner

An Install Partner is used for large-scale software deployment having high bandwidth capabilities and high availability servers whereby an ISP is typically used to host the installation server.

Application Owner

The Application Owner is the customer of the provisioning system and is someone who can take role of any of the previously described actors. The precise role of the Application Owner is typically based more on business considerations rather than on technical issues.

Cryptographic Keys

The following definitions for cryptographic keys are used in the following discussion. It should be noted that not all keys are necessary for implementing the invention whereby the use of any individual key may depend on the specific application.

There are several types of keys that fall within the concept of the invention, each one serving a specific purpose.

Personal identity key, associated with physical persons, release officer (ROK)

Temporary keys, used for registration and setup of CA systems. (CRK)

Device identity keys, used for secure communication (TK)

Software key, used for signing and verification of software (BDK, BPK, SK, IK)

Boot Development Keys (BDK)

The BDK are used in the early development phase in a typically restricted environment in which no Security officer policy is applied. The keys are unique for each development system so the damage remains limited when the private key is inadvertently exposed.

Customer Registration Keys (CRK)

The CRK is generated by the Provisioning Partner and is stored in a Bastion server shipped to the Application Owner as part of the development system. A primary purpose of the CRK key is to authenticate and distinguish the Customer Release Officer and the Provisioning Partner. Upon a successful registration the key can be discarded from the Bastion and not used again.

Boot Production Keys (BPK)

The public keys are stored on the target units and are used to verify the first image loaded from external storage. All images must be signed with the corresponding private key. If the private key is compromised the security of all target units containing the corresponding public key may be lost. Given the importance of keeping the private key secure it is stored in a highly secure Bastion server that is offline. The Release Officer is typically responsible of maintaining the security of the private key.

Release Officer Keys (ROK)

As previously mentioned, the ROK is used to approve a software image for provisioning. The key can be used to sign an installer image by the BIOS production key or to upload an image to the install server for future mass deployment.

Installer Keys (IK)

The IK keys are used to establish trust between the target unit and the provisioning system before the target acquires a X509 certificate of its own. In addition to the public keys, the installer target unit receives a certificate issued by the CA that is generated the Installer keys. A secondary pair of keys signed by the same issuer is used in the online environment installation scenario.

Target Identity Keys (TK)

The TK keys are generated after a successful installation has been completed on the target unit and are sent together with the CA-certificates to the Application Owner's OM-server.

Service Key (SK)

This key is generated for each suite of services that define a software release. The purpose of the key is to assure the integrity of the software release and the service. The use of asymmetric key technology also allows the target unit to verify that the issuer of the service is authenticated.

During the development phase, the developer is allowed to sign services without the involvement of the Release Officer. However, for a production release the base software may contain a different key that requires the involvement of the Release Officer.

System Overview

FIG. 1 shows an overview of the system architecture depicting servers in support of online provisioning systems, operating in accordance with an embodiment of the invention. The Application Owner 100 in this embodiment is the customer of the provisioning system. Within the development environment 102 the systems relating to Bastion 1, Bastion 2, the Installation Server, and Test target are used during development, where all functions needed for small-scale production are installed on a few servers. The Production environment 110 contains servers needed by a hosting partner 120 in a full-scale production environment. A further two servers 130 and 140 handle the initial installation and recovery of systems. They can belong to either the Application Owner or a Hosting Partner. Further servers include the hardware manufacturer 130 and the customer server 140. At the end of the production line is a server to configure and test the unit according to predefined test manifest. The system is then passed to the customer via a Logistics Partner in who does the final assembly of the unit before sending it to the customer. This is a way to reduce the necessity of having expensive components in stock since it is often more economical to buy standard components after a firm order is received. From the security perspective the logistics partner can responsible for handling cryptographic keys. The other role the Logistics partner plays is that of an intermediary to maintain the confidentiality of the install base customers from the factory. Although the Logistics partner plays an important role, several applications are defined at the customer premises, such as installation, software failure, and hardware replacement.

FIG. 1 thus shows an Application Owner 100 comprising or controlling a Development environment 102 and a Production Environment 110. The Development environment 102 comprises a Bastion 1 104, a Bastion 2 106, an Install server 108 and a Test target 112. The Production environment 110 comprises an Offline message OM server 114. In the embodiment shown in FIG. 1, an Install Partner 116 is shown as a separate entity and comprises Logging means 118, an Install server 121, a CA server 122 and a Logistics server 124. A Hardware Manufacturer 150, comprising a manufacturer server 130 and a Customer 160 comprising a customer server 140, is shown in relation to a time line 180 for the purpose of illustrating the order of different phases of the lifetime of a Target unit 156.

In Factory phase 152 the Target unit 156 is provided with a USB stick and communication occurs with the Install Server 121 to exchange factory identity information of the Target unit 156. In a Logistics phase 154 logistics identity information is exchanged with the Install Server 121. In the Installation phase 162 the Target unit 156 is in the illustrated embodiment in the possession of the Customer 160 and the USB stick is used to start the Target unit and install software in communication with the Install Server 121. In the Production phase 164 the Target unit 156 is running in its intended operational state, and when the Target unit 156 is started it boots with program instructions from the USB or from an internal compact flash memory CF, and communication occurs with the OM Server 114. In SW Recovery phase 168 the Target unit 156 is recovering from a software error, and thus started from the USB stick installs new software in communication with the Install server 121 and the OM Server 114. In HW Replacement phase 170 the hardware of the Target unit 156 is replaced and new software is installed in communication with the Install server 121 and the OM server 114.

Figure 1A:
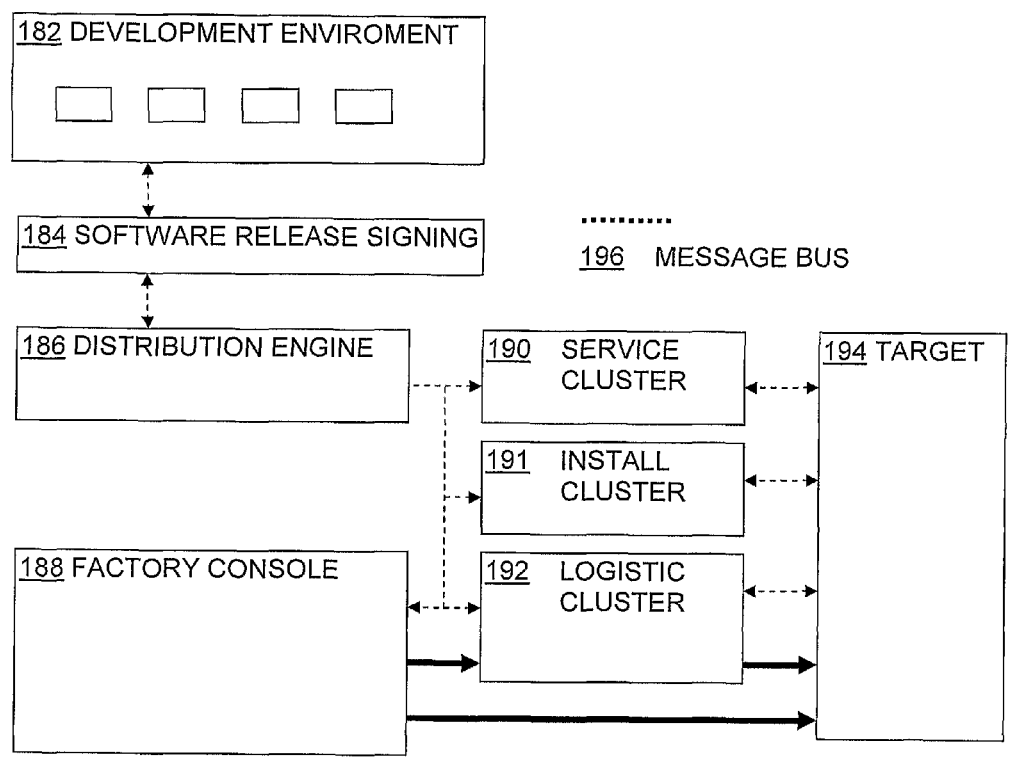

FIG. 1A shows a higher level view of the infrastructure needed to support provisioning that includes the concept of clusters. The development cluster contains a small scale fully functional provisioning system. The development cluster contains all functions needed in a production environment distributed on a limited number of computer units. The keys being used during the development cycle belong to a different domain than the keys used in production. The idea being that provisioning is introduced early in the product lifecycle.

FIG. 1A shows a Development Environment 182, a Software Release Signing entity 184, a Distribution Engine 186, a Factory console 188, a Service Cluster 190, an Install Cluster 191, a Logistic Cluster 192 and a Target unit 194 communicating via a Message Bus 196 as shown with the arrows.

The communication paradigm for the cluster arrangement is that of a multicast message bus. It is used both internally within a host and externally between hosts. All external communications are encrypted and authenticated and the framework writes three types of data on top of the bus, as shown in FIG. 1B.

Figure 1B:
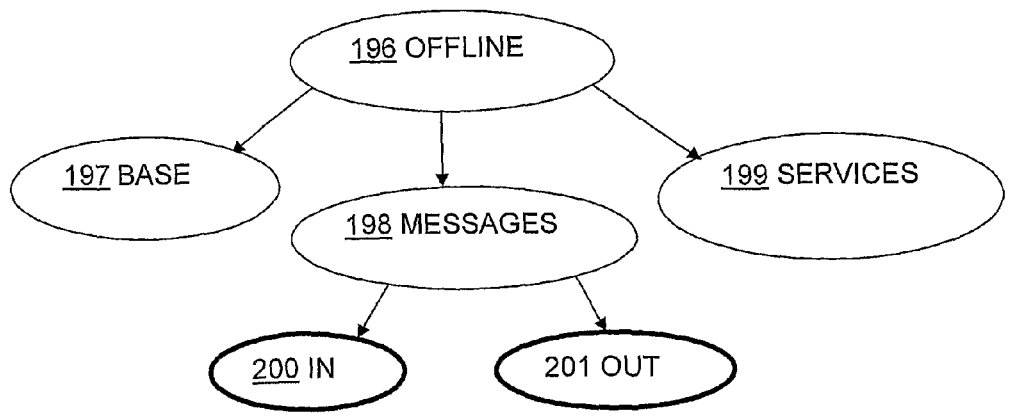

FIG. 1B shows the internal communications offline 196 with the types of data, viz. bas 197, messages 198, services 199. The messages are external data and have the basic types in 200 and out 201.

Figure 1C:
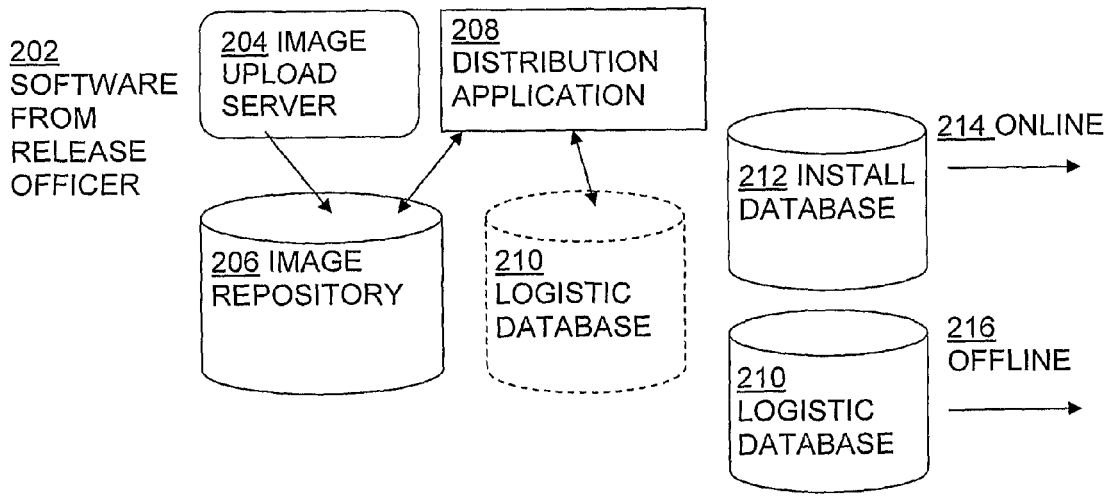

FIG. 1C is a diagram of an exemplary distribution engine operating in accordance with the invention. The server matches the released software with target units. A mismatch of hardware/software versions is avoided by acquiring data from the logistic/install cluster responsible for each target unit.

FIG. 1C illustrates how software 202 from a Release officer stored in an Image upload server 204 is loaded into an Image repository 206. A Distribution application 208 in communication with the Image repository 206 and a Logistic Database 210 monitors the software and hardware versions. An Install Database 212 is provided for the distribution of software and the Logistics Database 210 for keeping track of the distribution of software and hardware. The distribution is adapted for online 214 and offline 216 use cases.

Figures 1D, 1E:
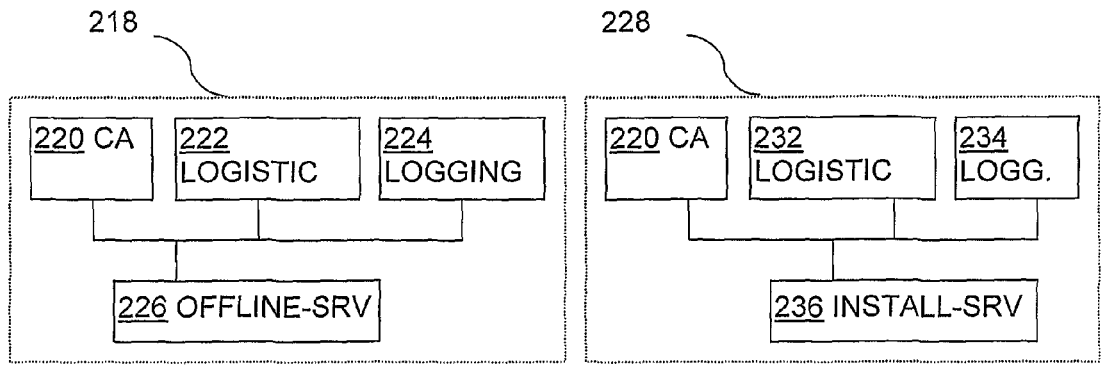
Figure 1F:
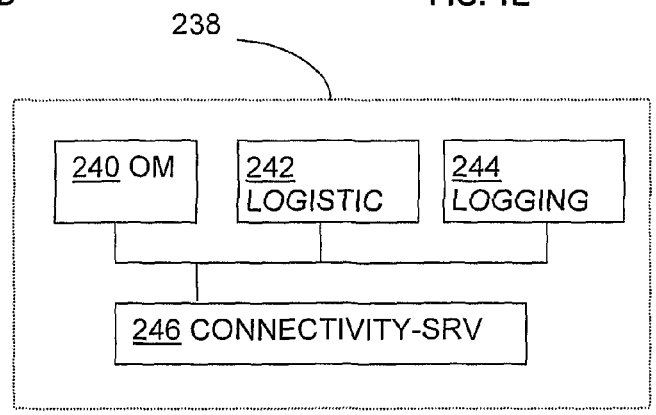

FIGS. 1D-F show exemplary diagrams of the Logistic Cluster, Install Cluster, and Service Cluster. The Logistic Cluster is a collection of servers is responsible for installing software for offline provisioned targets, generating and installing identity certificates for each offline-provisioned unit. The Offline Message proxy server is used for upgrades and recovers routines and administrating data on the offline provisioned units. The shown Logistics cluster 218 comprises a CA server 220, a Logistic server 22, a Logging server 224 and an Offline server 226.

The Install Cluster is a collection of servers that is responsible for installing the base software for the online provisioned target units and generating and installing identity certificates for online-provisioned units without cryptographic modules. It also generates and installs identity certificate for online-provisioned units without cryptographic modules. The shown Install cluster 228 comprises a CA server 230, a Logistic server 232, a Logging server 234 and an Install server 236.

The Service Cluster is a collection of servers that is responsible for install services for provisioned target units and provides a mirror of the configuration of the provisioned unit. It also monitors the state of the target unit and associated services. The shown Service cluster 238 comprises an offline message proxy server OM 240, a Logistic server 242, a Logging server 244 and a connectivity server 246.

Returning to FIG. 1A, a factory console unit is placed at the end of the assembly line and performs a test and configuration of the motherboard. Each network interface is assigned a MAC-address from the console whereby the console is able to communicate by sending messages either in online or offline mode.

Software Release Signing

In a large scale provisioning system, a bad OS image can affect a large number of target units since the mistake is propagated widely. There is no real simple solution to this problem since it is not easy to block the images containing defective code. Most developers are resigned to the fact that all software usually contain some bugs and it is prudent to have effective procedures to handle them such as detecting problems, patching the code and releasing updated versions quickly.

Figure 1G:
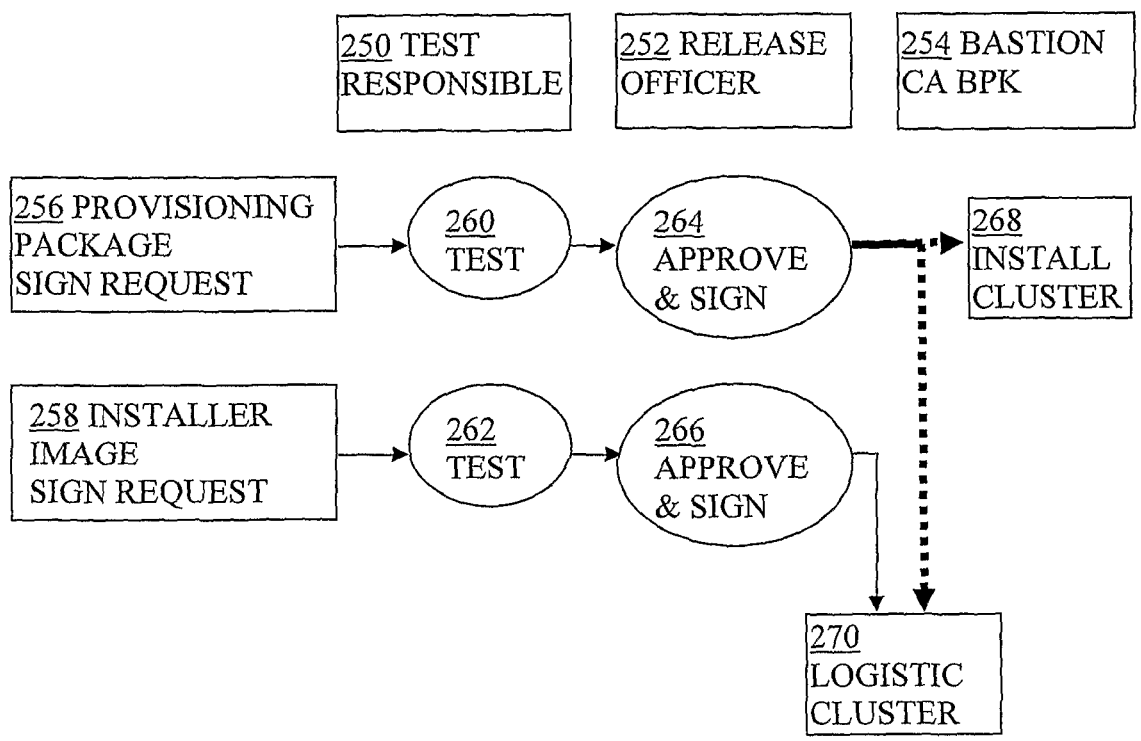

FIG. 1G shows an exemplary procedure for software release signing in accordance with the embodiment of the invention. A Test Officer is introduced as a tollgate between the developer and the Release Officer. The Bastion CA containing the Production Boot Key can be configured to only sign if both officers have signed the sign request. However, a limitation of this arrangement is that this puts some restrictions on the formats of some data used in the organization.

In FIG. 1G there is shown entities for a Test Responsible 250, a Release Officer 252 and a Bastion CA server housing boot production keys BPK. In the steps it is shown that:

256 A provisioning package and a signature request are communicated to a test stage.

258 An Installer image and a signature request are communicated to a test stage.

260 The provisioning package and a signature request are tested. If approved, the provisioning package and the signature request signed by the Test responsible 250 are passed on to the release officer 252.

262 The Installer image and the signature request are tested. If approved, the Installer image and the signature request signed by the Test responsible are passed on to the release officer 252.

264 The Release officer releases the provisioning package and also signs the signature request, whereupon Bastion CA server 254 signs the Provisioning package against a boot production key.

266 The Release officer releases the Installer image and also signs the signature request, whereupon Bastion CA server 254 signs the Installer image against a boot production key.

268 The signed Provisioning package is communicated to and received in an Install cluster.

270 The signed Installer image and the Provisioning package are communicated to and received in a Logistic cluster.

Security Bootstrap of Development System

The provisioning system is designed to make the transition from small-scale pilot project to full-scale production smooth and secure. Security is the cornerstone of provisioning and thus a well-thought out security policy must be implemented as part of the overall architecture. There is mutual trust relationship between the Provisioning Partner and the Application Owner. The Application Owner must have full control of the key that signs the software images that the target verifies during the early boot procedure. The Application Owner must also be in safe possession of the key that approves images for provisioning. The manufacturer must also have a strong authentication method when expediting a provisioning request that involves large number of target units. During development the test and Release Officer procedures may be omitted.

An exemplary order for a development system may include an order from the Application Owner to the Provisioning Partner that includes, among other things, an order confirmation, signed agreement, and email of customer Release Officer which are all needed to complete the transaction.

Figure 2:
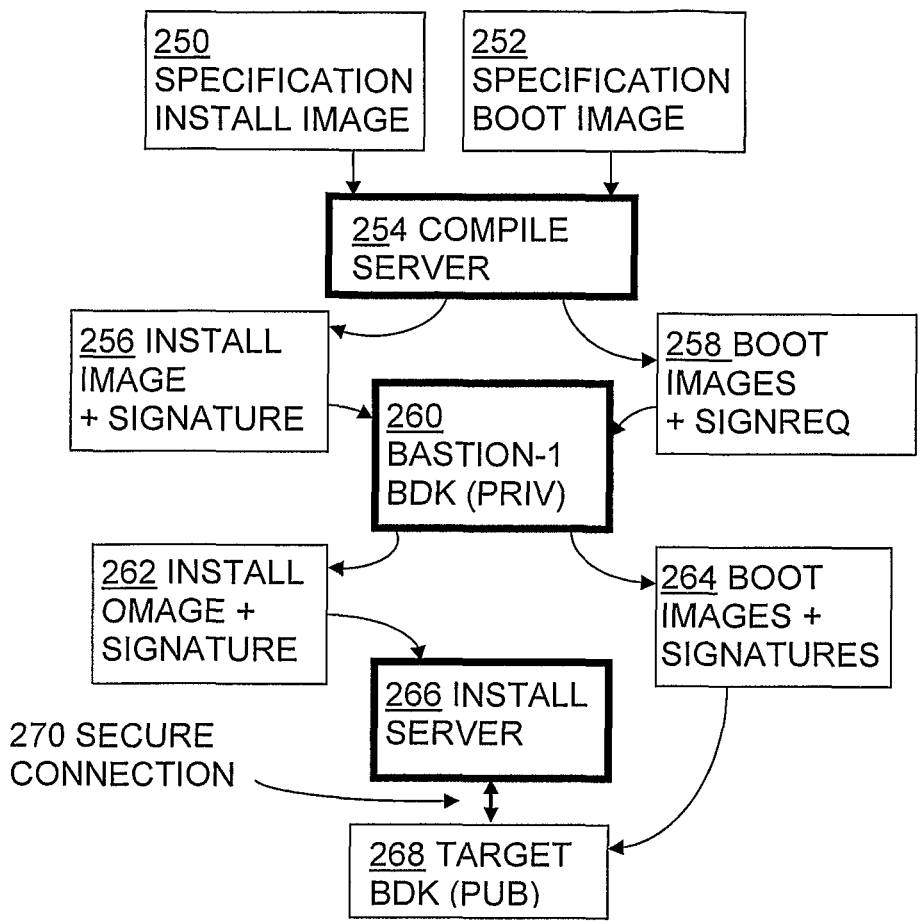
FIG. 2 is a block diagram of an exemplary development system in accordance with an embodiment.

FIG. 2 shows a block diagram of an exemplary development system in accordance with an embodiment of the invention. The Application Owner (customer of Provisioning Partner) receives the development system with everything preconfigured to work in a standalone environment. The Provisioning Partner prepares the development system and Generates the Development BIOS Keys (BDK) for enabling the key holder to alter the BIOS to force the computer system to boot from the external media as the default action e.g. the USB-stick. Additionally, the BIOS code is programmed to verify the OS image on the USB-stick using the public-key. The BDK private key is placed in Bastion-1 where the BDK public-key is loaded in the set of target computers. The final step is to generate customer registration keys (CRK) so the customer can take control of the target computer.

The compile server reads specification files that control which packages to compile. The output is an image together with a signature request that is written to a USB-stick. The next step is to insert the USB-stick into the Bastion host that is preconfigured from the Provisioning Partner. The install image is inserted in the Install server, which verifies the image against the public BDK key preinstalled in the server. The boot image USB-stick is then inserted into the target computer which is left there such that the BIOS directs at each restart to read from the USB-stick by default. The USB-stick can be inserted into the unit before deployment or, in the case of offline upgrade, the USB-stick containing the upgrade can be simply inserted to replace the previous one thereby enabling largely "unattended" upgrades since it does not require further intervention by support personnel.

In the block diagram of FIG. 2 the blocks show Specification of install image 250 and Specification of boot image 252 in communication with Compile server 254. The Compile server 252 outputs an install image with corresponding signature request 256 and boot images with corresponding signature request 258 that are written to the USB stick. The USB stick is then connected to the Bastion-1 host 260 and receives signatures against the private BIOS Development Key BDK—block 264. The Install image in block 262 likewise receives signatures signatures against the private BIOS Development Key BDK of Bastion-1 260, and the Install image with signature is then input to the Install server 266. The USB stick with the boot images and signatures are inserted to the Target unit 268. The Target unit 268 boots from the USB stick and establishes a secure connection 270 with the install server 266.

The BIOS of the present invention includes additional functions within the code that include a watchdog, signature verification capability, and drivers for file system access capabilities for accessing on a file basis rather than the typical master boot record that accesses on a boot and sector basis. The role of the watchdog is to assure that the system is operating in a know state and if not the system is directed to reboot.

When the target computer is powered on the BIOS directs it to check for the existence of an inserted USB-stick. It should be noted that it is possible to program the BIOS to check for the existence of other of external media however in the embodiment the USB port is generally the most practical because of the proliferation of USB based storage media as commodity items that are very inexpensive, not to mention the prevalence of MP3 player devices capable of storing files thus making them ideally suited for storing files.

Figure 3:
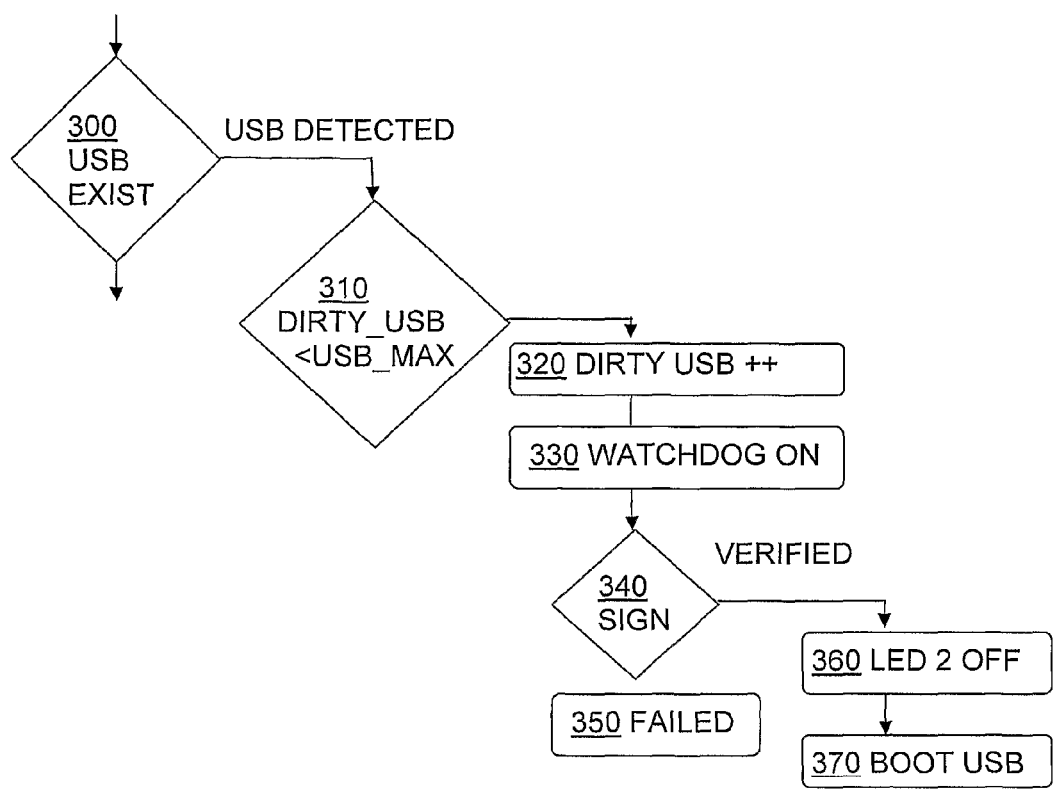
FIG. 3 shows a flowchart of an exemplary boot procedure operating in accordance the embodiment.

FIG. 3 shows a flowchart of the exemplary boot procedure operating in accordance the embodiment. The outlined procedure is able to avoid the situation where the target computer hangs when a defective USB-stick has been inserted into the USB port. The target computer keeps track of how many boot attempts have been made. If the number of attempts is less than a maximum value (e.g. five attempts) as shown in step 310, the "Dirty_USB" 320 counter is set and the watchdog 330 sets to a sufficiently long period to detect whether the system is in an unknown state such as 300 seconds, and the number of attempts in the counter is incremented by one. The signature of the OS file is checked for validity in step 340, if it is not verified the process is failed at step 350, after which the system attempts a reboot back from step 300. If the signature is verified then the boot images are loaded and the target unit begins to execute the OS image on the USB-stick. In step 360 an Led 2 is turned off and as mentioned the system is booted from the USB in step 370.

When the boot image residing on the USB-stick executes it begins by preventing the watchdog to reset the target. If the state of the system is correct, i.e. the Attempt_To_Boot counter i.e. "ATB=0", the installation procedure begins. Finally the ATB counter is reset to zero to reflect the new state of the target and the system is rebooted.

Figure 4:
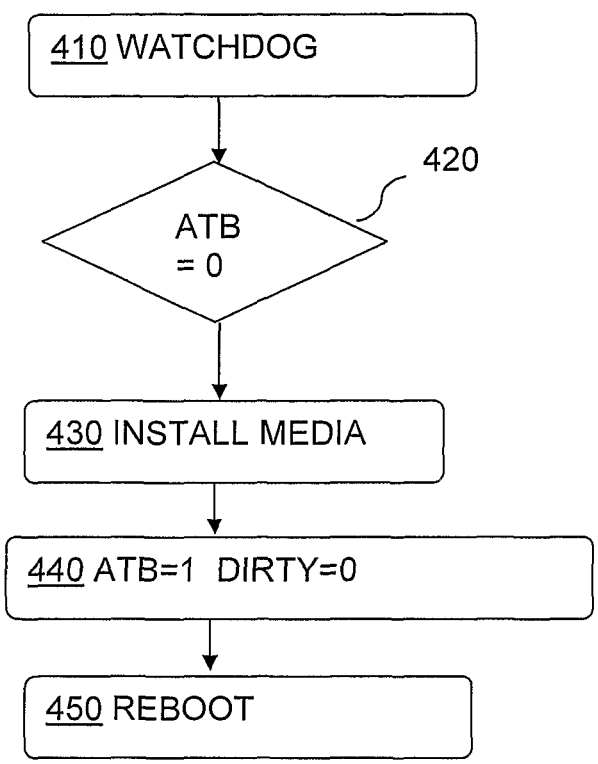
FIG. 4 is a flowchart that shows the install media module for both offline and online use cases.

FIG. 4 is a flowchart that shows the install media module that represents a small application that handles both offline and online use cases. If the install OS image is located on the USB-stick it is fetched from this device, otherwise a mutually authenticated and encrypted session is established against the install server so that the install OS image is streamed from the server, which is verified. The signature file written by the Bastion server is verified in offline mode when the files reside on the USB-stick or when the installer image is loaded from the install server.

In FIG. 4 the install media module comprises a Watchdog activated in step 410 and a test in step 420 on an attempt to boot flag ATB. If the ATB flag=0, media is installed in step 430. After the install media step 430, control flags ATB and a dirty media flag are set in step 440 such that attempt to boot flag ATB=1 and dirty media flag Dirty=0. Thereafter, the system reboots in step 450.

Figure 5A:
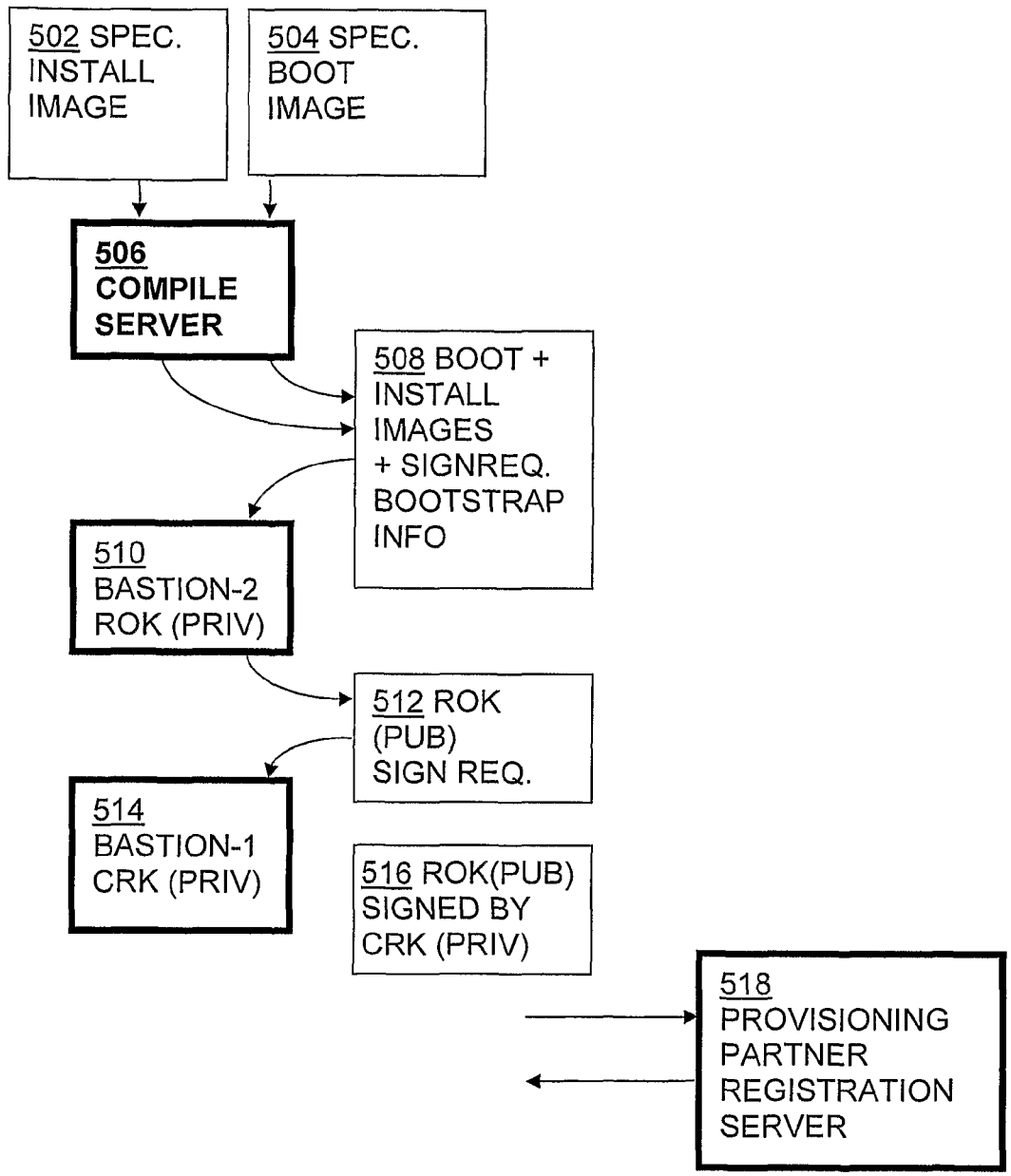
FIGS. 5a and 5b show an exemplary process for the Register Release Officer at the Provisioning Partner.
Figure 5B:
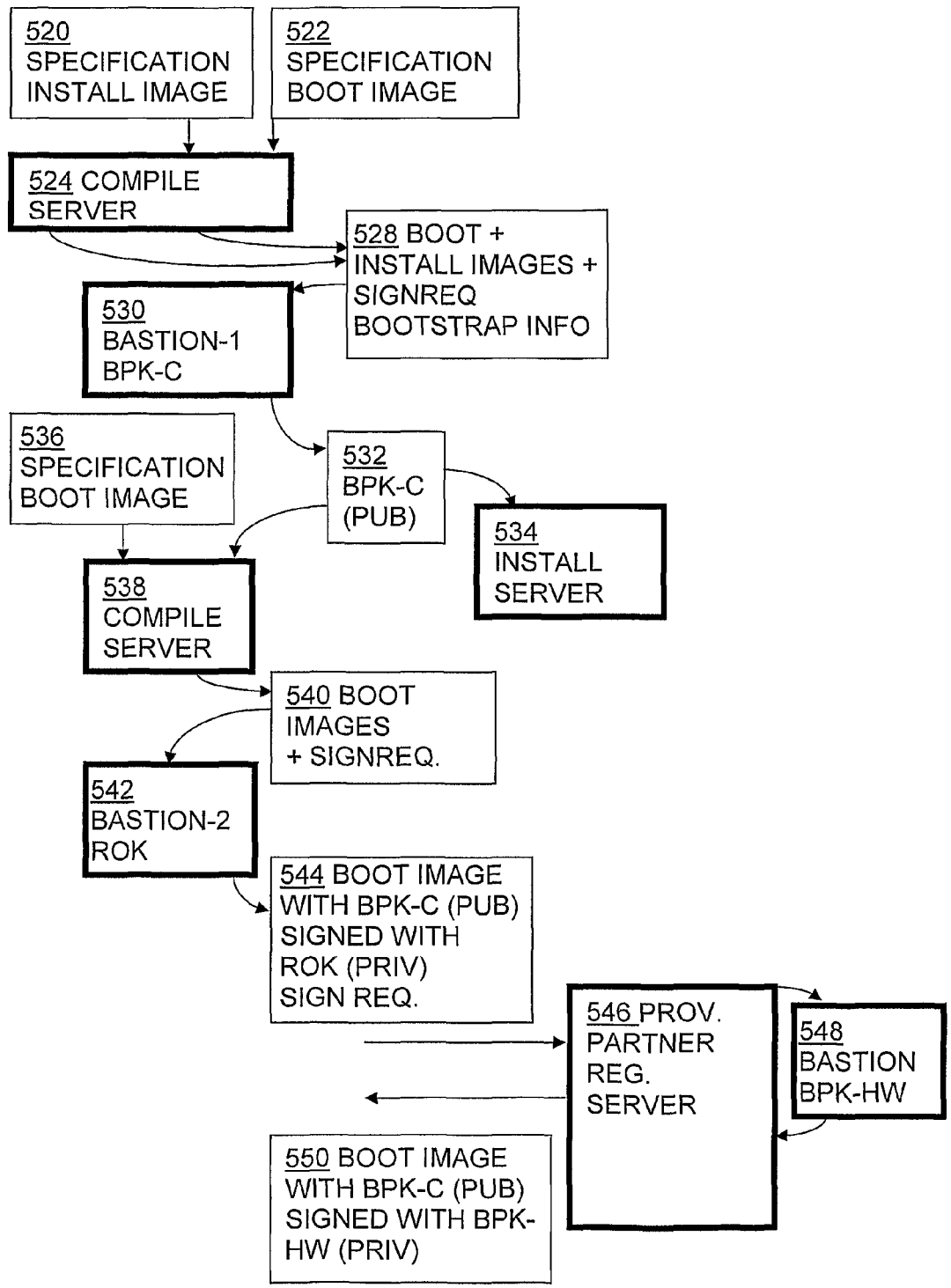

FIGS. 5a and 5b show an exemplary process for the Register Release Officer at the Provisioning Partner in accordance with the invention. At this stage the developer has managed to build a target unit that is ready for provisioning. The next batch of target units contain another boot key than the key found in the target units shipped earlier. The Application Partner must request the vendor of target units to use its own private key to sign the new install OS image. It is important to try to reduce security threats as much as possible since provisioning partners may also work concurrently with the Application Owner's competitors.

The private part of the keys, which belong to the Application Owner's Release Officer and Production BOOT procedure, are not exposed outside the two Bastions servers. Therefore the Application Owner must generate these two keys. The Provisioning Partner must have a method to associate these new keys with an existing customer. The Bastion-1 prepared by the Provisioning Partner contains a special key for this purpose (CRK).

From this point on the Application Partner is able to order target units in large volumes from the Logistics Partner. The installer OS image signed by the manufacturer of the target units enables the Application Owner to replace the public keys in parameter memory (BPK-hw) with its own (BPK-c) customer key thereby enabling the customer to have complete control of the unit and shutting out all others. The parameter memory (BPK-hw) is a non-volatile type memory such as flash or EEPROM that typically located on the motherboard of the unit configured to store the keys. The installer OS image must be implemented so this key replacement is made before the signature of the installer OS image is verified on the USB-stick.

In the flow chart of FIG. 5a, the steps show:

502 Specification of install image is input to compile server.

504 Specification of boot image is input to compile server.

506 Compile server processes the input install image and boot image.

508 Compile server outputs boot and install images with a signature request and bootstrap info.

510 Bastion-2 server receives signature request from step 508 and produces a signature against release officer key ROK (priv), and outputs a signature with a public release officer key ROK (pub).

512 The public release officer key ROK (pub) and a signature request is input to the Bastion-1 server.

514 Bastion-1 server receives signature request and produces a signature against a private Customer registration key CRK (priv), and outputs the public release officer key ROK (pub) signed by the Customer registration key CRK (priv).

518 Information relating to the public release officer key ROK (pub) and the Customer registration key CRK (priv) is exchanged with a registration server of the provisioning partner.

In the flow chart of FIG. 5a, the steps show:

520 Specification of install image is communicated to compile server.

522 Specification of boot image is communicated to compile server.

524 Compile server processes the received install image and boot image.

528 Compile server outputs boot and install images with a signature request and bootstrap info.

530 Bastion-1 server receives signature request from step 528 and produces a signature against customer boot production key BPK-c, and outputs a signature with a public customer boot production key BPK-c (pub).

532 The signature with the public customer boot production key BPK-c (pub) is communicated to an Install server and to a compile server.

534 The Install server receives the signature with the public customer boot production key BPK-c (pub).

536 A specification boot image is communicated to the compile server.

538 The compile server receives the specification boot image and the signature with the public customer boot production key BPK-c (pub), and outputs boot images and a signature request.

540 The signature request is communicated to a Bastion-2 server.

542 The Bastion-2 receives signature request and outputs a boot image with public customer boot production key BPK-c (pub) signed with private release officer key ROK (priv) and a signature request.

544 The boot image with public customer boot production key BPK-c (pub) signed with private release officer key ROK (priv) and the signature request are communicated to a registration server of a provisioning partner.

546 The registration server communicates with Bastion server hosting hardware boot production keys BPK-hw.

548 The BPK-hw Bastion server returns information to the registration server.

550 The registration server outputs a boot image with public customer boot production key BPK-c (pub) signed with the private hardware boot production key BPK-hw (priv).

Figure 6:
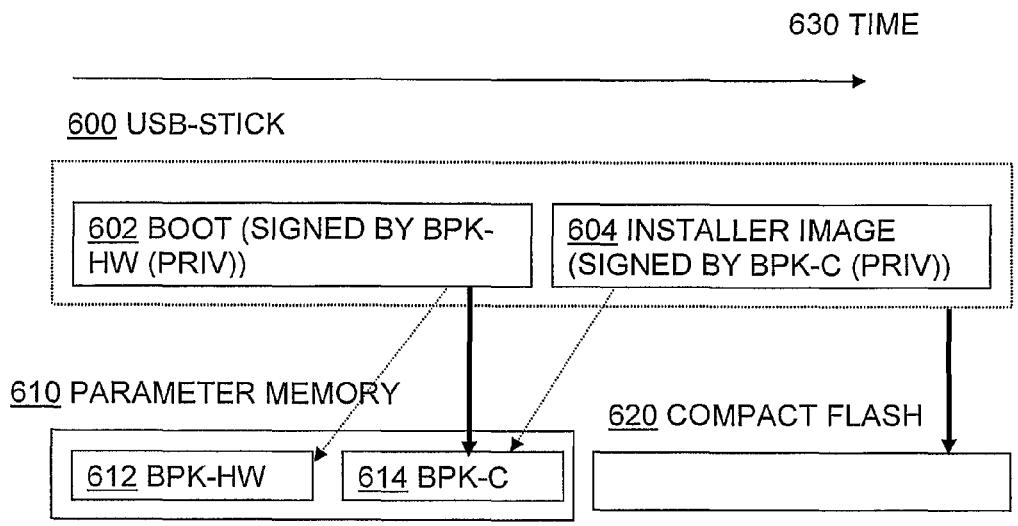
FIG. 6 shows the configuration of the USB-stick and parameter memory at the time of the first installation.

FIG. 6 illustrates the configuration of the USB-stick and the target unit parameter memory at the time of the first installation into the target unit that is shipped with boot key belonging to the hardware vendor. The first OS image loaded from the USB-stick is the boot OS image and its signature is verified against the hardware vendor's public key stored in the parameter memory located on the motherboard. The boot image is signed by the vendor's private key which allows it to take control of the target unit. Before the installer OS image is loaded the BPK-hw is replaced with the Application Owner's own key (BPK-c), after which the installer OS image can be loaded.

FIG. 6 schematically shows a USB-Stick 600 as well as the parameter memory 610 and compact flash 620 of a target unit in relation to a time line 630. The USB-stick 600 comprises a boot image 602 signed by a private hardware boot production key—boot (signed by BPK-hw (priv))—and an installer image 604 signed by a private customer boot production key—installer image (signed by BPK-c (priv)). The parameter memory 610 comprises stored therein a hardware boot production key BPK-hw 612 and a customer boot production key BPK-c 614.

The USB stick can remain in the USP port to act as a recovery boot path. Since the key that verifies this image was replaced, the signature must also be replaced. The boot image must be implemented so that it reads the key from parameter memory first for comparison with the customer key where upon a difference between the keys causes the customer key to be rewritten to the parameter memory. This permits the same OS image to be signed by two keys enabling replacement of the signature file. It is a preferable operation to read from flash memory rather than to perform write operations since some types of rewriteable memory typically have a limited number of write cycles that can be reliably read.

Online Provisioning

Figure 7:
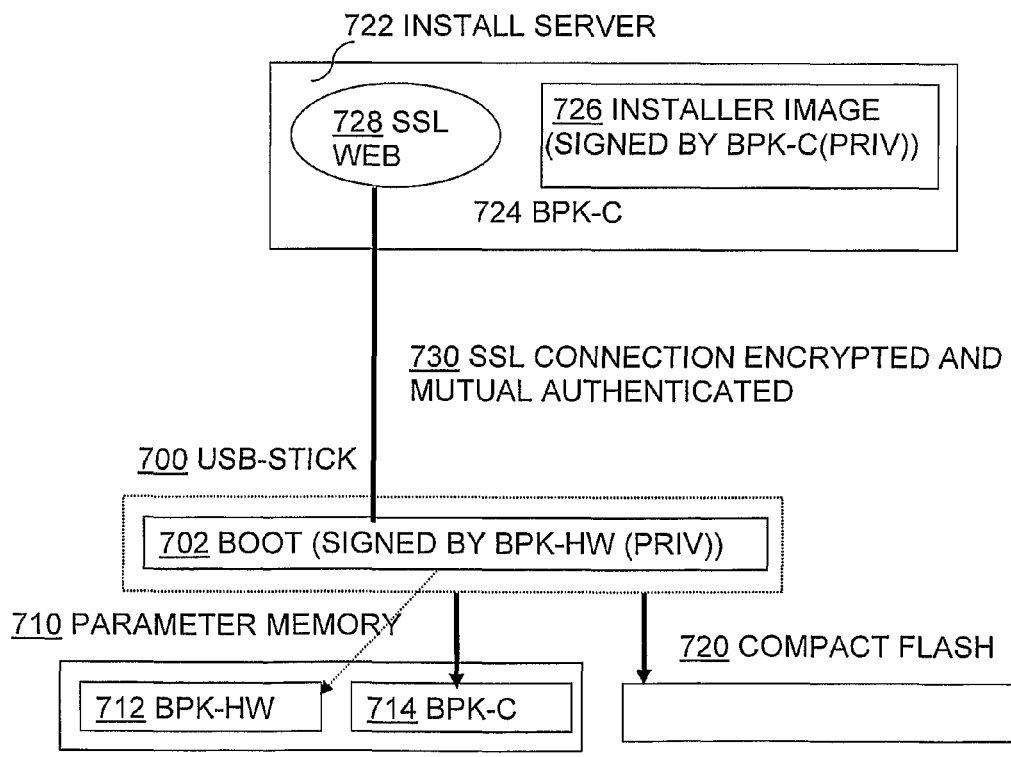
FIG. 7 shows an exemplary arrangement for online provisioning in accordance with the present invention.

FIG. 7 shows an exemplary arrangement for providing online provisioning of the OS boot image in accordance with the present invention. The separation of the boot image and installer image in the offline case allows to be easily modified for use for online provisioning. By way of example, it may be desirable to recover certain target units from software failures by rebooting over an online connection. An Internet based standard (Secure Socket Layer) SSL-connection can be perceived as a secure extension of the signature verification of the install OS image. Here the install OS image is verified against as the same key that resides in the parameter memory on the target unit. The SSL-connection is unique for each installer image and provides the advantage of controlling whether the connection made with respect to a specific server. The method permits the image to be streamed over the SSL-connection thereby allowing relatively fast installation of very large hard drives on the target units.

The arrangement shown in FIG. 7 thus comprises a USB-stick 700 as well as the parameter memory 710 and compact flash 720 of a target unit. The USB-stick 700 comprises a boot image 702 signed by a private hardware boot production key—boot (signed by BPK-hw (priv)). The parameter memory 710 comprises stored therein a hardware boot production key BPK-hw 712 and a customer boot production key BPK-c 714. An install server 722 comprises a public customer boot production key BPK-c 724 and an installer image 726 signed by the private customer boot production key—installer image (signed by BPK-c (priv)). The install server is provided with an SSL WEB interface 728 for communicating with the USB-stick 700 via a SSL connection 730 that is encrypted and mutually authenticated.

BIOS Functionality

Figure 8:
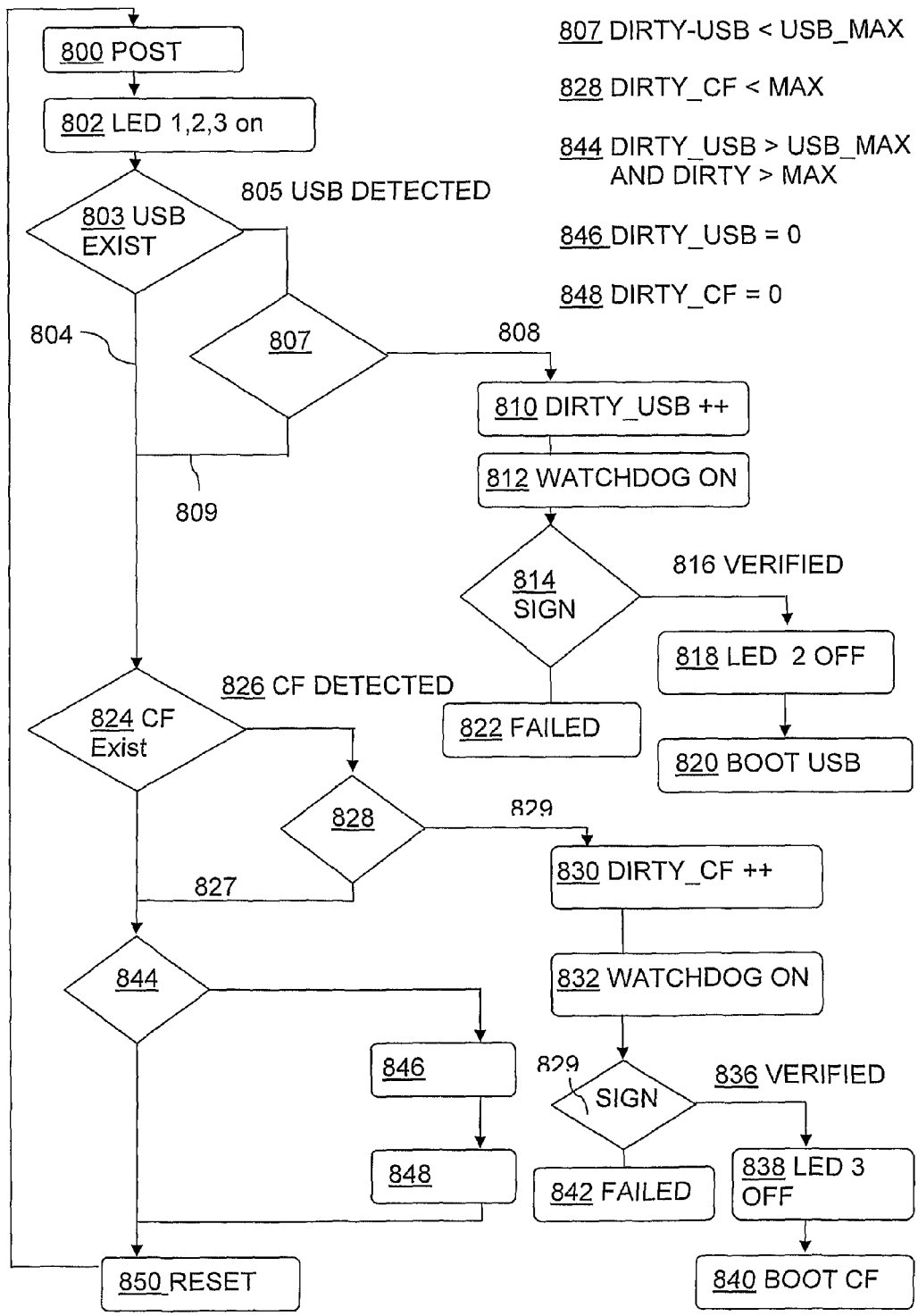
FIG. 8 is a flow diagram showing the BIOS operating in accordance with the present invention.

FIG. 8 is a flow diagram illustrating the functionality of the BIOS operating in accordance with an embodiment of the present invention. In standard computers the BIOS is a layer of system resident code that serves as an operational interface between the operating system and the hardware devices to provide software and hardware compatibility. The BIOS according to the invention is adapted to perform additional tasks that enable the secure provisioning in the way of OS image verification and recovery in the case of system failure.

When the system is first powered on it performs a normal power-on self test (step 800 POST and step 802 LED 1, 2, 3 on), which is standard procedure for most computers. It then checks if a second boot media (e.g. a USB-stick—step 803 USB Exist) is present in a USB port. Prior to booting from the USB-stick (process branch 805 USB Detected) it checks (step 807 Dirty_usb<USB_max) the number of times it previously tried to boot from USB-stick, in which case, each (failed) attempt the "Dirty_USB" parameter is incremented by one. If this parameter exceeds a predetermined number "USB_max" (e.g. five) it will discontinue (process branch 809) and attempt to boot from the primary media e.g. Compact Flash rewritable memory on the motherboard.

The BIOS as implemented in the invention contains support for a file system that eliminates the need for specially formatted media on a sector basis. By way of example, if the file system is the Linux VFAT file system that is compatible with Windows long filenames on the FAT files system, any compatible portable memory such as an MP3 player can be used to carry the three boot files required by the bootstrap procedure. Each file is digitally signed with an asymmetric private key that corresponds to the public key stored as an integral part of the motherboard. If the signature for all files are verified the boot procedure proceeds to phase two i.e. loading an operating system.

Before control is passed to the new system, the watchdog is set (step 812 Watchdog on) and the "Dirty_USB" is incremented (step 810 Dirty_usb++). The BIOS of the invention differs from that in a standard PC in that a watchdog is implemented in the boot phase. Cf. also FIGS. 3 and 4.

The signature of the boot image on the USB is checked for validity (step 814 Sign), if it is not verified the boot process is failed (step 822 Failed) and thereafter the system attempts to reboot back from step 800. If the signature of the boot image is verified (process branch 816 Verified), the boot process continues, check LED 2 is switched off (step 818 Led 2 off) and the system boots from the USB (step 820 BOOT USB).

If no secondary media is detected i.e. no USB-stick is present (process branch 804), the system attempts to boot from the primary media (e.g. the compact flash) (step 824 CE Exist). By always first attempting to boot from the secondary media, the solution can be extended to cover an offline system with the ability for a rescue boot procedure. If the system has a valid uncorrupted primary media installed, it will always attempt to boot from secondary media. This means that the boot procedure must eventually return to running the operating system from primary media for stable system execution.

In step 824 CF Exist it is checked that a primary media exists, in this example a compact flash CF. If a compact flash is detected (process branch 826 CF Detected), it is checked whether a "Dirty_cf" parameter exceeds a Max-value (step 828 Dirty_cf<Max). The Dirty_cf parameter is a count of the number of times it previously tried to boot from the primary media, i.e. here the compact flash. If the value of the Dirty_cf parameter is less than the max value, the process continues in branch 829 and the Dirty_cf parameter is incremented by one (step 830 Dirty_cf++) and a watchdog mechanism is started (step 832 Watchdog on). The signature of the boot image on the compact flash is checked for validity (step 834 Sign), if it is not verified the boot process is failed (step 842 Failed) and thereafter the system attempts to reboot back from step 800. If the signature of the boot image is verified (process branch 836 Verified), the boot process continues, check LED 3 is switched off (step 838 Led 3 off) and the system boots from the compact flash (step 820 BOOT CF).

In the unlikely case where both the primary (process branch 827) and secondary media (process branch 809) are corrupted, the "Dirty_USB" parameter and the dirty compact flash parameter "Dirty_cf" will both eventually reach the maximum predetermined value "USB_max" (since the multiple attempted reboots will fail), which will be reset to back to zero allowing continued boot attempts. The main purpose is to allow the operator the opportunity to insert a valid media containing uncorrupted bootable software in the case where neither media is bootable.

In this case it is checked if the "Dirty" parameters exceeds the max values (step 844 Dirty_usb>USB_max AND Dirty>Max) and if so (process branch 845), the Dirty_usb parameter (step 846 Dirty_usb=0) and the Dirty_cf parameter (step 848 Dirty_cf=0) are reset to zero. Thereafter, the boot process is reset (step 850 Reset) and the system attempts a new boot attempt.

By introducing the set of "max" and "dirty" parameters relating to the second media, the system is resilient in the case of power failure during a software upgrade of the second media, for example. The only critical region that exists is the upgrade of the BIOS, however, this can be avoided by using an inhibit write operation to the BIOS-memory by setting a jumper of switch to read-only memory.

Figure 9:
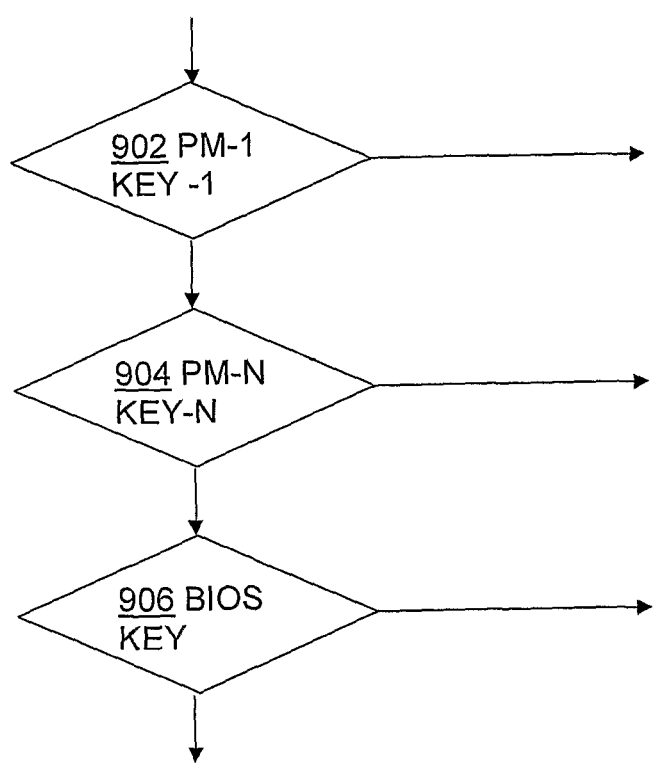
FIG. 9 shows the public keys stored in parameter memory and BIOS key stored in the BIOS.

For the verification process the verification algorithm involves an asymmetric public key. There can be several keys that are tested in sequence e.g. the first keys are stored in a separate memory, and other keys are stored in the BIOS itself, in a static data region of the BIOS, for verification purposes. It is possible to produce a customer BIOS with a different key than that used by the manufacturer. PMEM keys are stored in parameter memory and BIOS key is stored in BIOS, as shown in FIG. 9. This mechanism could also be used to allow redundancy in case of the BPK hosted in the offline Bastion server in some way becomes lost.

FIG. 9 shows parameter key number 1 stored in parameter memory 1 (902 PM-1 KEY-1), parameter key number N stored in parameter memory number N (904 PM-N KEY-N) and BIOS key stored in BIOS (904 BIOS KEY).

Redundant Boot Production Keys

The Bastion server is designed to be a very secure way to store the private key that corresponds to the BIOS. Even so it is often prudent to provide a backup for these keys and this means there may risk of them being exposed outside the Bastion host. Since the keys are typically checked in sequence on the target unit, this mechanism can be used to deploy a second Bastion that can also sign boot and install images. In the case where the Bastion malfunctions, a new Bastion can be initiated and new keys are distributed to all related target units using the other production Bastion. Another method can be to prepare a new bastion at the Application Partner and sign an installer image containing the new key with the existing Bastion's private key.

Figure 10:
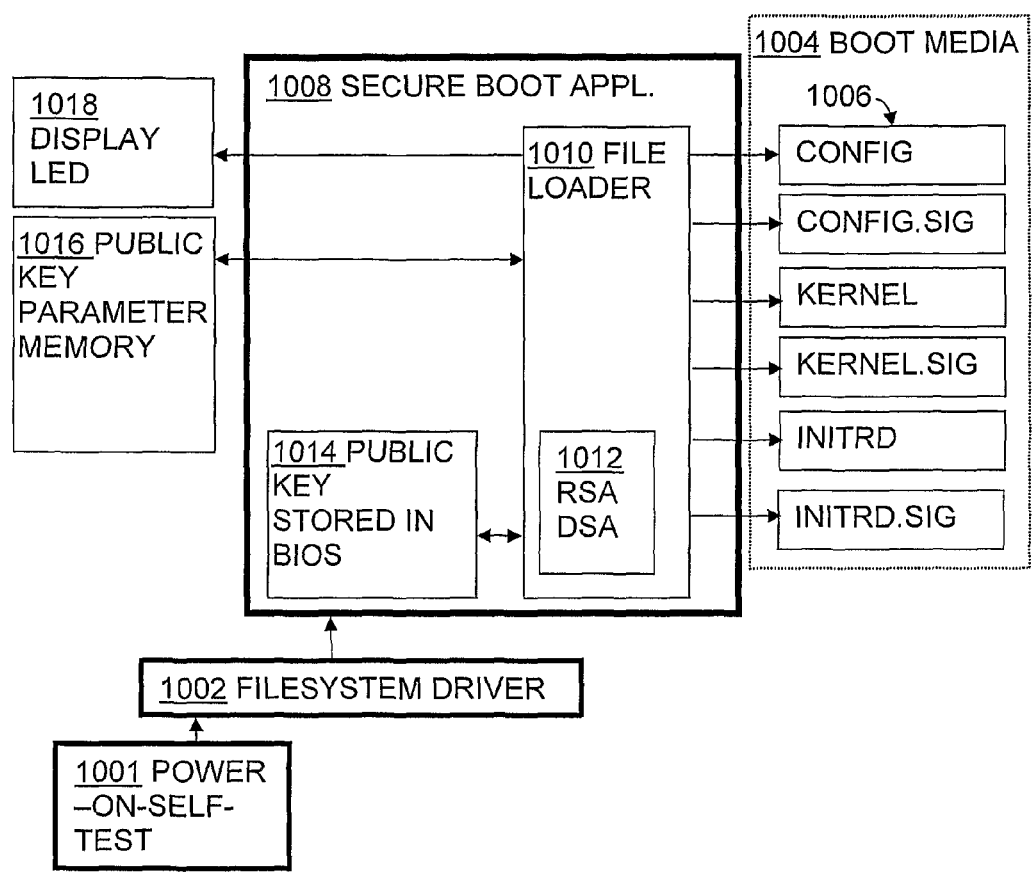
FIG. 10 illustrates the secure boot loader residing in BIOS-flash as implemented in the embodiment.

FIG. 10 illustrates the secure boot loader residing in BIOS-flash as implemented in the embodiment of the invention. The first module 1001 is power-on self test. Upon successful power-on the system loads a driver 1002 for the file system used on the boot media, e.g. a file based system such as VFAT, although other file based systems can be used. As previously mentioned, this approach has the desirable advantage of eliminating the need for using preformatted media of a Master Boot Record thereby allowing a whole host of consumer storage products to be used such as mobile phones, MP3-players etc. All of these common consumer items may be used to act as a boot device without jeopardizing security, since digitally signed images must be verified before there are allowed to be loaded. Finally, the system selects a second or primary boot media 1004 and retrieves boot files 1006 with associated signature files, for example boot files like config, kernel and initrd as well as signature files config.sig, kernel.sig and initrd.sig. This is achieved by means of the secure boot application 1008 of the invention comprising a file loader 1010 having a RSA or DSA encryption key generator circuit 1012. The signatures are checked against keys stored in parameter memory 1016 (outside the BIOS) or a key 1014 stored in the BIOS itself. The secure boot application also controls the common check displays with LEDs 1018.

Boot Media Layout

Figure 11:
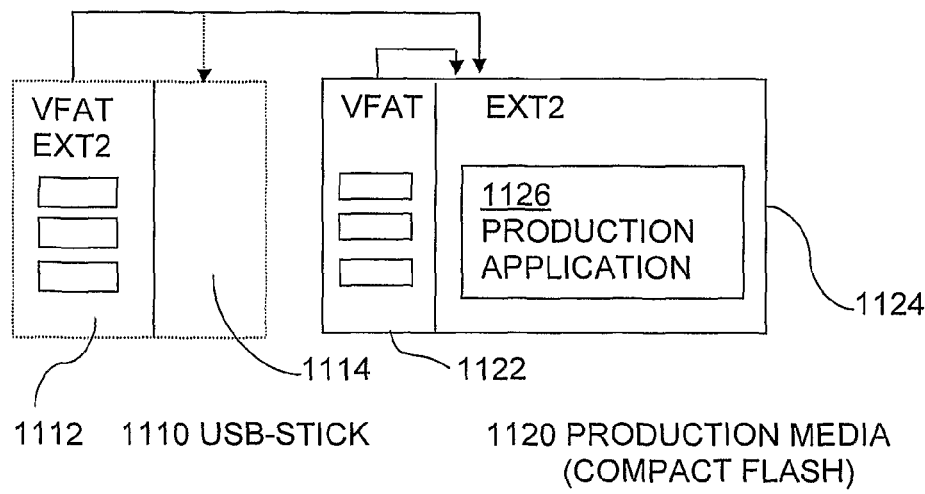
FIG. 11 shows an exemplary layout of the boot media.

FIG. 11 shows an exemplary layout of the boot media. The solution becomes more robust when the media is divided into partitions and maintains the boot partition as read-only. Compact flash memory is common in industrial computers, however a known drawback is the limitation on the number of write cycles it can handle before the data becomes unreliable.

The operating system image is placed in a single large file that is authenticated by the developer from the digital signature that is successfully verified during loading into the internal ram. The operating system located on the boot partition is responsible to assure that the root-partition (production file system) is correct. This procedure is not part of the secure boot but there exists a "hook" in the system for performing this test. It should be noted that there is no requirement for having more than one file system on the USB-stick since e.g. for offline deployment there can also be a single VFAT-partition carrying the installer-image.

FIG. 11 shows boot media in the shape of a USB-stick 1110 with partitions 1112 and 1114, and production media in the shape of a compact flash memory 1120 with partitions 1122 and 1124. A production application 1126 is stored in the production media partition 1124.

Parameters Stored in the Motherboard

Figure 12:
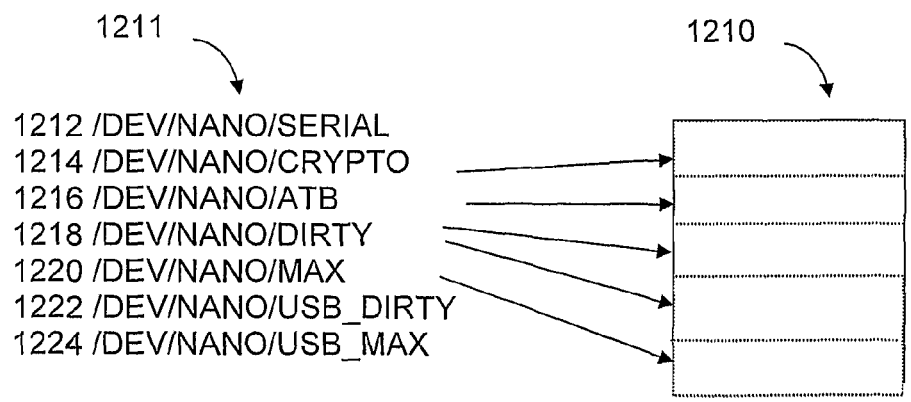
FIG. 12 shows an exemplary configuration of the parameter memory.

FIG. 12 shows an exemplary configuration of the non-volatile parameter memory 1210 and information types 1211 stored therein in accordance with the embodiment of the present invention. The parameter memory must be available to both BIOS and the operating system. The serial number 1212 is typically written during production of the unit and can be used in the application certificates when the system is deployed. The cryptographic keys 1214 can be replaced during the installation procedure and the "ATB" parameter 1216 can be set to force a second installation (recover/upgrade) of the system. The parameter memory keeps state of the system independently of secondary media (USB-stick/Compact Flash).

The "Dirty" parameter 1218 is an integer that is incremented each time the system attempts to boot from the primary media. It is set to zero if the system shuts down successfully. The "max" parameter 1220 limits the number of boot attempts such that when the "dirty" parameter reaches the value of "max", some user defined action is performed e.g. contacting backend servers or sending an alarm etc. A similar set of parameters keep track of the secondary media i.e. the "usb_dirty" 1222, "usb_max" 1224 etc. for like reasons.

The embodiment uses an AT97SC3202 TPM memory module from Atmel (although other types of memory can be used), which has been found to work well with the invention, and offers a highly "tamper proof" mechanism for storing keys on the system. The keys are generated inside the chip during initialization and only the public key is extracted. A manufacturer can be instructed to send a signed list of all public keys to backend servers to assure that no replicas of the system can be introduced during installation, as they are checked before permitting the OS images to download.

Booting from Secondary Media

Figure 13:
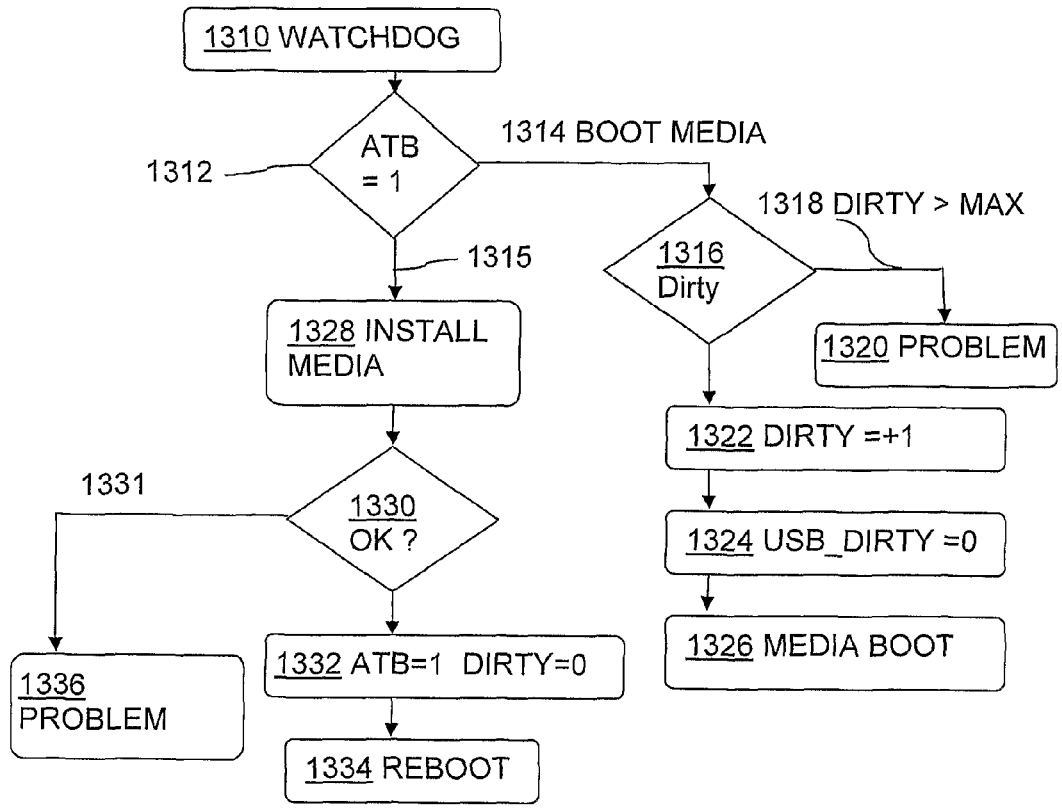
FIGS. 13 and 14 are flowcharts illustrating the boot procedure for the operating system residing on secondary media.

FIG. 13 is a flowchart illustrating the boot procedure for the operating system residing on secondary media (USB-stick) in accordance with the embodiment. The BIOS boot loader sets the watchdog (step 1310) to reset the system after 300 seconds and starts an application to avoid resetting the watchdog. It then checks if the state of "ATB" parameter is set to zero (step 1312 ATB=1), if it is (process branch 1315) it starts installation of software onto the primary media (step 1328). After the installation it changes the value of "ATB" parameter to one (step 1332) and attempts to reboot (step 1334). The illustrated process also includes a test if the media installation was successful (step 1330 OK?) and if not (process branch 1331), suitable action for problem handling is taken (step 1336 Problem).

If the "ATB" parameter is already set to 1 (process branch 1314 Boot media), and "Dirty" parameter (step 1316) has a value less than "max" (process branch 1317) it increments the "Dirty" parameter (step 1322 Dirty=+1), sets the USB_dirty parameter to zero (step 1324 Usb_dirty=0) and executes a code jump to the primary root partition (step 1326 Media boot). This is possible since the code has already been loaded into RAM. If the "Dirty" flag exceeds "max" (process branch 1318 Dirt>MAX) it takes a suitable action (step 1320 Problem) such as to contact and alert the backend server.

Booting from Primary Media

Figure 14:
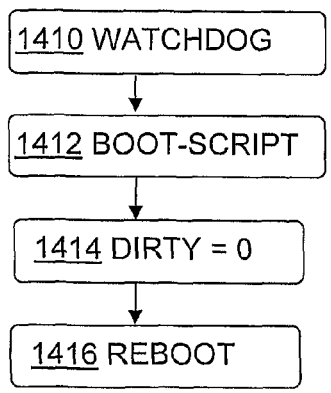

The process for the production system is somewhat simpler than the process for the installation and recovery media, as shown in FIG. 14. The enabling of the watchdog (step 1410) in BIOS is handled in the production system. The boot script 8 step 1412) can be used to reinstall the USB-stick whereas the system is designed to survive even if power is lost during an upgrade of the secondary media. Before the USB-stick can be upgraded remotely, the boot script directory should be loaded with a script that reads the "Dirty_USB" parameter (step 1414 Dirty=0), which detects whether there was a problem during an earlier upgrade, and reinstalls the OS image. Thereafter, the system is rebooted (step 1416 Reboot).

Identity of Target Unit

To detect whether an unauthorized target unit clone is attempting to install the software image, it is desirable to be able to identify which units have previously and legitimately performed a sanctioned download. Attempts by unidentified or cloned units to install previously installed images will be denied. The identity of each target unit can be ascertained in part by using a manufacturer allocated unique serial number of each unit. This together with the domain name can be used to uniquely identify the target unit in question. For example, a unit having serial number 1234 operating from the domain nano-system.com will be detectable as 1234@nano-system.com. The provisioning system generates a certificate using the concatenated string as distinguishing label in the digital certificate. Regardless of whether the target unit is deployed in an offline or online environment, the provisioning system sends the certificate of the target unit, after which the system can be delegated to the Application Owner. It should be noted that the certificate can be generated differently depending on the environment.

19

Online Environment

If the target unit lacks an RSA chip in an online environment it boots the installer image and establishes an encrypted and mutually authenticated SSL-connection. It extracts the serial number of the target and sends a certificate request to the install server. The install server checks whether the actual target has a certificate and, if not the request is passed to the CA-server that returns a certificate which is stored on the server and then downloaded to the target unit. The serial number of a legitimate target unit would exist in the provisioning database and the state of the unit must be delivered.

If the target unit contains an RSA chip in the online environment, the private key cannot be extracted from hardware since the chip is considered virtually tamperproof. The keys are generated inside the chip in response to a key generation request that takes places at the factory or with a trusted Logistics Partner. The factory (or Logistics Partner) signs a list of all expedited target units and sends the list to the Provisioning Partner. The target unit runs the initial installer image and provides the public key through the SSL-connection where it is checked against the database. If the key exists in the database the provisioning system is assured that the correct unit is connected and will accept the certificate request and, with assistance of the CA-server, returns an X509 format certificate with serial number and domain name.

Offline Environment

In the case where the target unit lacks an RSA chip in an offline environment the installer image will contain the necessary code to generate X509 keys when the system boot for the first time. The image has a public key that encrypts the resulting keys together with the serial number. The installer image is programmed to write back the encrypted data on the USB-stick and notify the operator via e.g. a display device. In this case the operator returns the encrypted data to the Provisioning Partner who decrypts the file and stores the data.

If the target unit contains an RSA chip in the offline environment, the installer image allows the RSA chip to generate the X509 keys when the system boots for the first time. The image also contains a public key that encrypts the resulting keys together with the serial number. The installer image is programmed to write back the encrypted data on the USB-stick and notify the operator thought the display. The operator returns the encrypted data to the Provisioning Partner who decrypts the file and stores its data.

Sequence Diagram for Online Install

Figure 15:
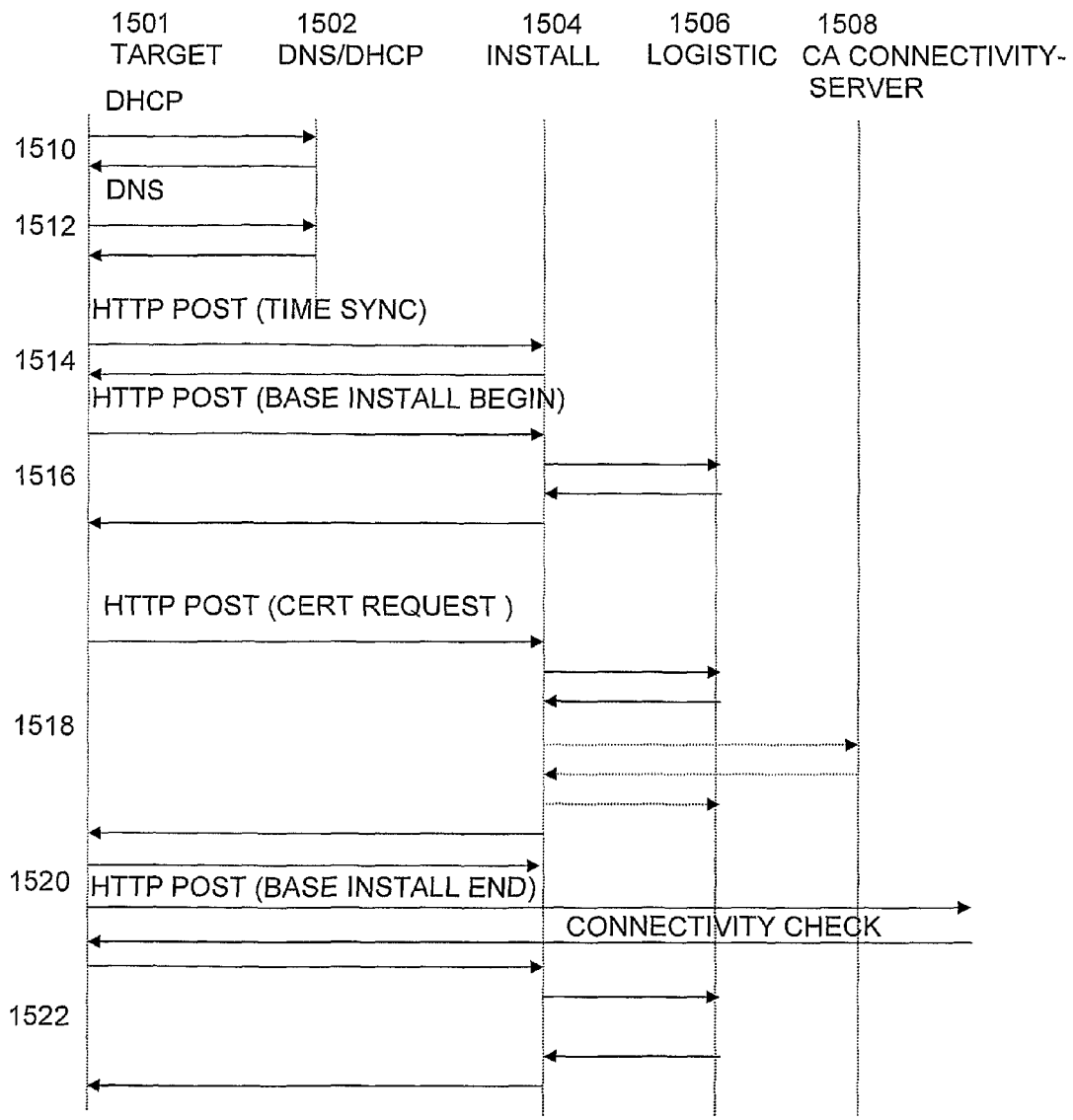
FIG. 15 illustrates an exemplary sequence diagram for the online install scenario in accordance with the embodiment.

FIG. 15 illustrates an exemplary sequence diagram for the online install scenario in accordance with the embodiment. The following steps can be seen from the messages shown in the sequence diagram. When the target unit 1501 boots it obtains a dynamic IP-address (1510) and performs a DNS-lookup (1512) for an SRV-record and receives a list of valid install-servers from DNS/DHCP server 1502. Before the SSL-connection is established, the clock must be synchronized (1514) otherwise the certificate could be rejected. The client presents (1516) the certificate (IK) that is bundled with the installer image together with the vendor unique serial number to the Install server 1504. The install-server 1504 performs a lookup against the logistic database 1506, if the target is in the correct system state, the state is updated and a ticket is returned which will be used in succeeding requests. If the target unit does not have an RSA-chip the serial number and domain name is concatenated and used in a certificate (1518). At 1520 base install ends. The final step relates to the target performing a connectivity check (1522) against the service cluster comprising a CA connectivity server 1508 before disconnecting from the install-cluster 1504.

20

Figure 16:
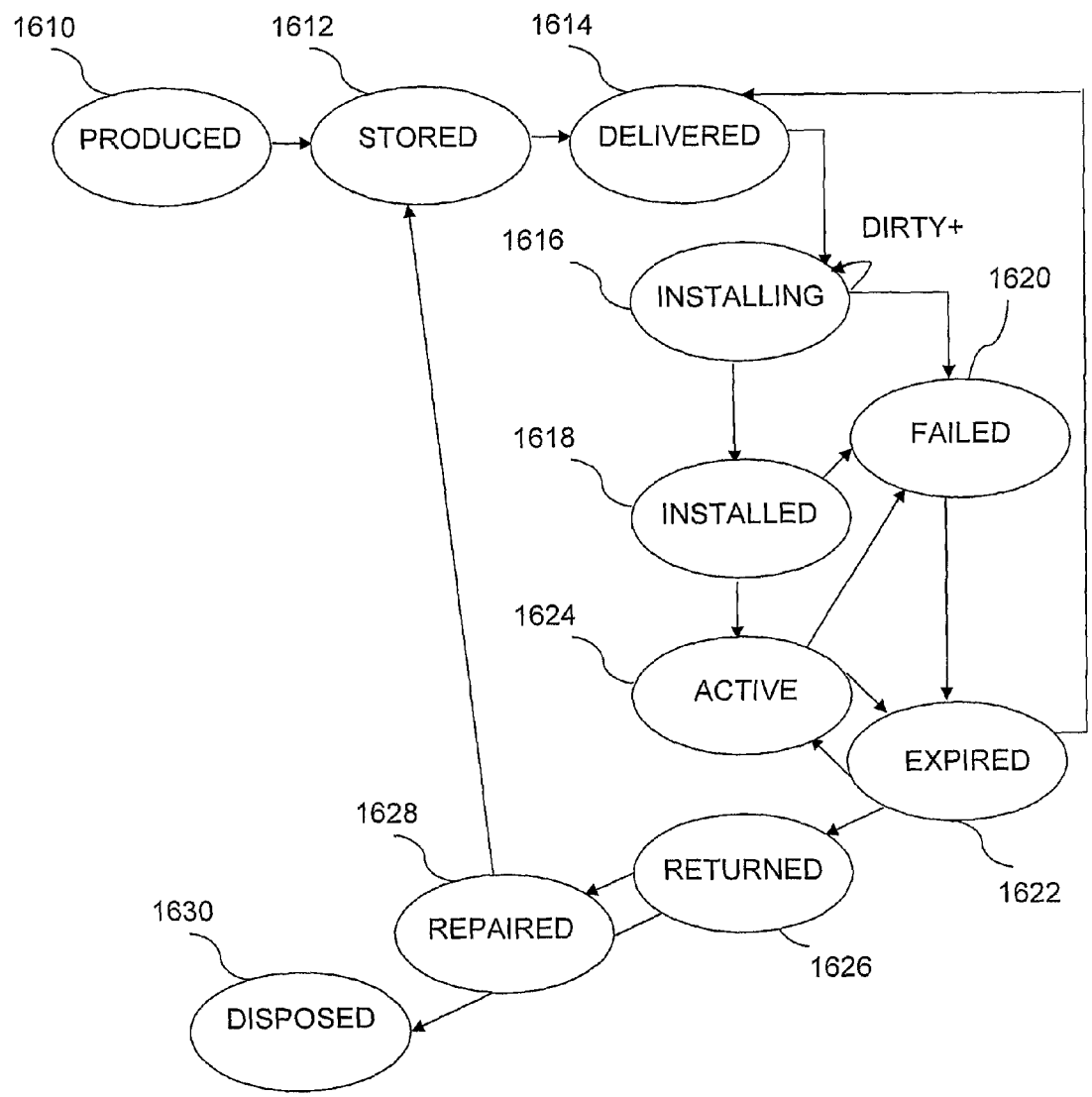
FIG. 16 shows an exemplary state diagram of the Logistics Server.

FIG. 16 shows an exemplary state diagram of the Logistic Server. In the factory the parameter memory located on the motherboard must be loaded with initial states and a unique serial number. The unit can be shipped from factory directly to end-user or through a Logistic Partner. The system is assigned to a specific end-user and the Logistic Server changes the state to DELIVERED. This is the only state where the system will accept a software download in order to prevent unauthorized cloning of units from a manufacturer. The end-user inserts the secondary boot media (USB-stick) which contacts the install-server where the INSTALLATION state can result in either a failure or success, in the later case the unit will reboot and use the primary media. The Logistic Server changes state to ACTIVE when the production application notifies that the unit is successfully installed. The EXPIRE state is used to indicate that a complete software recover is required or the unit needs complete replacement, in which case service personnel are alerted and dispatched to the area.

The state diagram of FIG. 16 shows the states Produced 1610, Stored 1612, Delivered 1614, Installing 1616, Installed 1618, Failed 1620, Expired 1622, Active 1624, Returned 1626, Repaired 1628 and Disposed 1630.

The foregoing description of the preferred embodiments of the invention has been presented for purposes of illustration and description. It is not intended to be exhaustive or to limit the invention to the precise forms disclosed, since many modifications or variations thereof are possible in light of the above teaching. Accordingly, it is to be understood that such modifications and variations are believed to fall within the scope of the invention. The embodiment was chosen to explain the principles of the invention and its practical application, thereby enabling those skilled in the art to utilize the invention for the particular use contemplated. It is therefore the intention that the following claims not be given a restrictive interpretation but should be viewed to encompass variations and modifications that are derived from the inventive subject matter disclosed.

The invention claimed is:

1. A method for initializing an operating system on a computer system in a secure manner, the computer system including an internal primary memory having a primary operating system image and corresponding bootstrap files recorded thereon, a non-volatile memory having a system BIOS recorded thereon, and a non-volatile parameter memory having a BIOS watchdog, and a digital signature verification functionality, the method comprising the steps of:

detecting a presence of a removable secondary memory coupled to the computer system, the secondary memory having a secondary operating system image and corresponding bootstrap files recorded thereon, the corresponding bootstrap files being signed by digital signatures, the secondary operating system image being identical to the primary operating system image;

first attempting to boot from the internal primary memory by using the primary operating system image after the step of detecting does not detect a presence of the removable secondary memory;

second attempting to boot from the removable secondary memory by using the secondary operating system image after the detecting detects the presence of the removable secondary memory, and incrementing a parameter for a number of boot attempts each time the attempting to boot from the removable secondary memory has failed;

checking whether the number of boot attempts from the removable secondary memory has exceeded a maximum number;

third attempting to boot from the internal primary memory by using the primary operating system image after the checking indicates that the maximum number has been exceeded;

activating the BIOS watchdog for assuring the system is operating in a known state during said step of checking the number of boot attempts;

verifying the digital signatures of the bootstrap files by the digital signature verification functionality;

booting from the secondary operating system image of the removable secondary memory when said digital signatures are verified by the step of verifying; and changing a boot procedure from the secondary operation system image to the primary operating system image, when at least one of said digital signatures cannot be verified by the step of verifying, by executing a code jump to the primary operating system image, such that the operating system continues to run as if it has been booting from the primary operating system image.

2. The method according to claim 1, wherein the step of attempting to boot from the internal primary memory comprises the steps of:

detecting a presence of the internal primary memory;

second checking whether a number of boot attempts from the internal primary memory has exceeded a maximum number;

resetting the number of boot attempts from the internal primary memory and the removable secondary memory after the step of checking and the second checking confirm that the number of boot attempts from the internal primary memory and the removable secondary memory have exceeded the maximal numbers;

attempting to boot from the internal primary memory by using the primary operating system image after the second checking confirms that the number of boot attempts from the internal primary memory has not exceeded the maximal value, incrementing a parameter for the number of boot attempts for the primary operating system image, activating the BIOS watchdog, accessing the primary operating system image and the corresponding bootstrap files, and verifying the digital signatures of the bootstrap files; and changing a booting procedure from the primary operation system image to the secondary operating system image after the digital signatures of the bootstrap files corresponding to the primary operation system image cannot be verified.

3. The method according to claim 1, further comprising:

initializing the system BIOS by executing code for initially reading from the removable secondary memory by default, code for providing a file system capability to access files on a file basis, code for verifying the digitally signed bootstrap files on the removable secondary memory using a corresponding public key, and code for running the BIOS watchdog for detecting a state of the computer system and for storing the state in a non-volatile parameter memory.

4. The method according to claim 1, further comprising the step of:

rebooting the system after the step of activating confirms that the system is not in the known state.

5. The method according to claim 4, further comprising the step of:

resetting the respective parameters to zero and rebooting the computer system after the number of boot attempts from the internal primary memory and from the removable secondary memory have exceeded the respective maximum numbers from the step of checking and second checking; and continuing a cycle of reboots until a valid operating system image is found on a newly inserted secondary memory.

6. The method according to claim 1, wherein in the step of verifying, the digital signatures use asymmetric key cryptography.

7. The method according to claim 1, wherein in the step of verifying, a public asymmetric key is independently stored and retrieved from a non-volatile parameter memory located at the computer system.

8. The method according to claim 1, wherein the primary and the secondary operating system images are identical Linux operating systems, and in the step of changing the boot procedure, the code jump is performed to an appropriate kernel after an Attempt-To-Boot counter (ATB) is set to one.

9. The method according to claim 1, further comprising the step of:

Provisioning the primary operating system image via clusters that include a Service cluster, Install cluster, and a Logistic cluster that interface with the computer system.

10. A computer system configured to provide an operating system in a secure manner, the computer system including a processor, an internal primary memory having a primary operating system image and corresponding bootstrap files recorded thereon, a non-volatile memory having a system BIOS recorded thereon, and a non-volatile parameter memory having a BIOS watchdog, and a digital signature verification functionality, the processor configured to detect a presence of a removable secondary memory coupled to the computer system, the secondary memory having a secondary operating system image and corresponding bootstrap files recorded thereon, the corresponding bootstrap files being signed by digital signatures, the secondary operating system image being identical to the primary operating system image;

first attempt to boot from the internal primary memory by using the primary operating system image after the detecting does not detect a presence of the removable secondary memory;

second attempt to boot from the removable secondary memory by using the secondary operating system image after the detecting detects the presence of the removable secondary memory, and to increment a parameter for a number of boot attempts each time the attempting to boot from the removable secondary memory has failed;

check whether the number of boot attempts from the removable secondary memory has exceeded a maximum number;

third attempt to boot from the internal primary memory by using the primary operating system image when the checking indicates that the maximum number has been exceeded;

activate the BIOS watchdog for assuring the system is operating in a known state during the checking the number of boot attempts;

verify the digital signatures of the bootstrap files by the digital signature verification functionality;

boot from the secondary operating system image of the removable secondary memory when the digital signatures are verified by the verifying; and change a boot procedure from the secondary operation system image to the primary operating system image, when at least one of said digital signatures cannot be verified by the verifying, by executing a code jump to the primary operating system image, such that the operating system continues to run as if it has been booting from the primary operating system image.

11. The computer system according to claim 10, the processor further configured to:
initialize the system BIOS by executing code for initially reading from the removable secondary memory by default, code for providing a file system capability to access files on a file basis, code for verifying the digitally signed bootstrap files on the removable secondary memory using a corresponding public key, and code for running the BIOS watchdog for detecting a state of the computer system and for storing the state in a non-volatile parameter memory.

12. The computer system according to claim 10, the processor further configured to:
reboot the computer system after the activating confirms that the computer system is not in the known state.

13. The computer system according to claim 12, the processor further configured to:
reset the respective parameters to zero and rebooting the computer system after the number of boot attempts from the internal primary memory and from the removable secondary memory have exceeded the respective maximum numbers as indicated by the checking and second checking; and
continue a cycle of reboots until a valid operating system image is found on a newly inserted secondary memory.

14. The computer system according to claim 10, wherein in the verifying, the digital signatures use asymmetric key cryptography.

15. The computer system according to claim 10, wherein in the verifying, a public asymmetric key is independently stored and retrieved from a non-volatile parameter memory located at the computer system.

16. The computer system according to claim 10, wherein the primary and the secondary operating system images are identical Linux operating systems, and in the changing of the boot procedure, the code jump is performed to an appropriate kernel after an Attempt-To-Boot counter (ATB) is set to one.

17. The computer system according to claim 10, the processor further configured to:
provision the primary operating system image via clusters that include a Service cluster, Install cluster, and a Logistic cluster that interface with the computer system.

* * * * *